US012533195B2

(12) United States Patent
Richter et al.

(10) Patent No.: US 12,533,195 B2
(45) Date of Patent: Jan. 27, 2026

(54) MODULAR ROBOT CONNECTOR

(71) Applicant: DEPUY SYNTHES PRODUCTS, INC., Raynham, MA (US)

(72) Inventors: Jorn Richter, Kandern (DE); Michael White, Oberdorf (CH); Philipe Lindenmann, Basal (CH)

(73) Assignee: DEPUY SYNTHES PRODUCTS, INC., Raynham, MA (US)

( * ) Notice: Subject to any disclaimer, the term of this patent is extended or adjusted under 35 U.S.C. 154(b) by 619 days.

(21) Appl. No.: 18/047,570

(22) Filed: Oct. 18, 2022

(65) Prior Publication Data

US 2024/0122659 A1 Apr. 18, 2024

(51) Int. Cl.
*A61B 34/30* (2016.01)
*A61B 17/00* (2006.01)

(52) U.S. Cl.
CPC .... *A61B 34/30* (2016.02); *A61B 2017/00477* (2013.01)

(58) Field of Classification Search
None
See application file for complete search history.

(56) References Cited

U.S. PATENT DOCUMENTS

| | | | |
|---|---|---|---|
| 8,152,721 B2 | 4/2012 | Michaeli | |
| 8,216,211 B2 | 7/2012 | Mathis | |
| 8,800,939 B2 | 8/2014 | Karsak | |
| 8,840,627 B2 | 9/2014 | De Mathelin | |
| 9,011,415 B2 | 4/2015 | Sanchez | |
| 9,782,224 B2 | 10/2017 | Piccin | |
| 9,888,941 B2 | 2/2018 | Lambrecht | |
| 10,271,914 B2 | 4/2019 | Nambi | |
| 10,512,511 B2 | 12/2019 | Anvari | |
| 10,682,129 B2 | 6/2020 | Stanton | |
| 10,828,116 B2 * | 11/2020 | Kostrzewski | A61B 34/30 |
| 10,939,968 B2 | 3/2021 | Kostrzewski | |
| 11,160,620 B2 * | 11/2021 | Ebbitt | A61B 34/10 |
| 2005/0124988 A1 | 6/2005 | Terrill-Grisoni | |
| 2011/0263971 A1 | 10/2011 | Nikou | |
| 2015/0366624 A1 * | 12/2015 | Kostrzewski | A61B 90/11 |
| | | | 606/130 |

(Continued)

FOREIGN PATENT DOCUMENTS

| | | |
|---|---|---|
| CN | 111700685 A | 9/2020 |
| EP | 3763315 A1 | 1/2021 |

(Continued)

OTHER PUBLICATIONS

International Search Report and Written Opinion for corresponding International Patent Application No. PCT/IB2023/060526 mailed on May 24, 2024.

*Primary Examiner* — Carl H Layno
*Assistant Examiner* — Bryan Mcallister Lee
(74) *Attorney, Agent, or Firm* — Kramer & Amado, P.C.

(57) ABSTRACT

A robot connector, including: a connector configured to connect to a mounting surface of a robot; a guiding insert that is compressible, wherein the guiding insert has an opening configured to receive a guide tube; a guide tube holder with an opening wherein the guide tube is attached to the connector and the opening is configured to receive the compressible guiding insert; and a locking mechanism configured to lock the guiding insert and the guide tube to the connector.

20 Claims, 25 Drawing Sheets

(56) References Cited

U.S. PATENT DOCUMENTS

| | | |
|---|---|---|
| 2018/0325609 A1 | 11/2018 | Kostrzewski |
| 2019/0223977 A1 | 7/2019 | Galili et al. |
| 2019/0231446 A1 | 8/2019 | Bowling |
| 2019/0231450 A1 | 8/2019 | Waterbury |
| 2019/0231454 A1 | 8/2019 | Kostrzewski |
| 2020/0188034 A1 | 6/2020 | Lequette |
| 2021/0007827 A1 | 1/2021 | Roussel |
| 2021/0133272 A1 | 5/2021 | Shribman |
| 2021/0137535 A1 | 5/2021 | Sharifi-Mehr |
| 2021/0153852 A1 | 5/2021 | Rubrecht |
| 2021/0212778 A1 | 7/2021 | Hooda |
| 2021/0259735 A1 | 8/2021 | Francisco |
| 2022/0401181 A1 | 12/2022 | Nishihara |

FOREIGN PATENT DOCUMENTS

| | | |
|---|---|---|
| JP | 2006061272 A | 3/2006 |
| WO | 2021084484 A3 | 6/2021 |
| WO | 2021/166185 A1 | 8/2021 |
| WO | 2021181164 A1 | 9/2021 |

\* cited by examiner

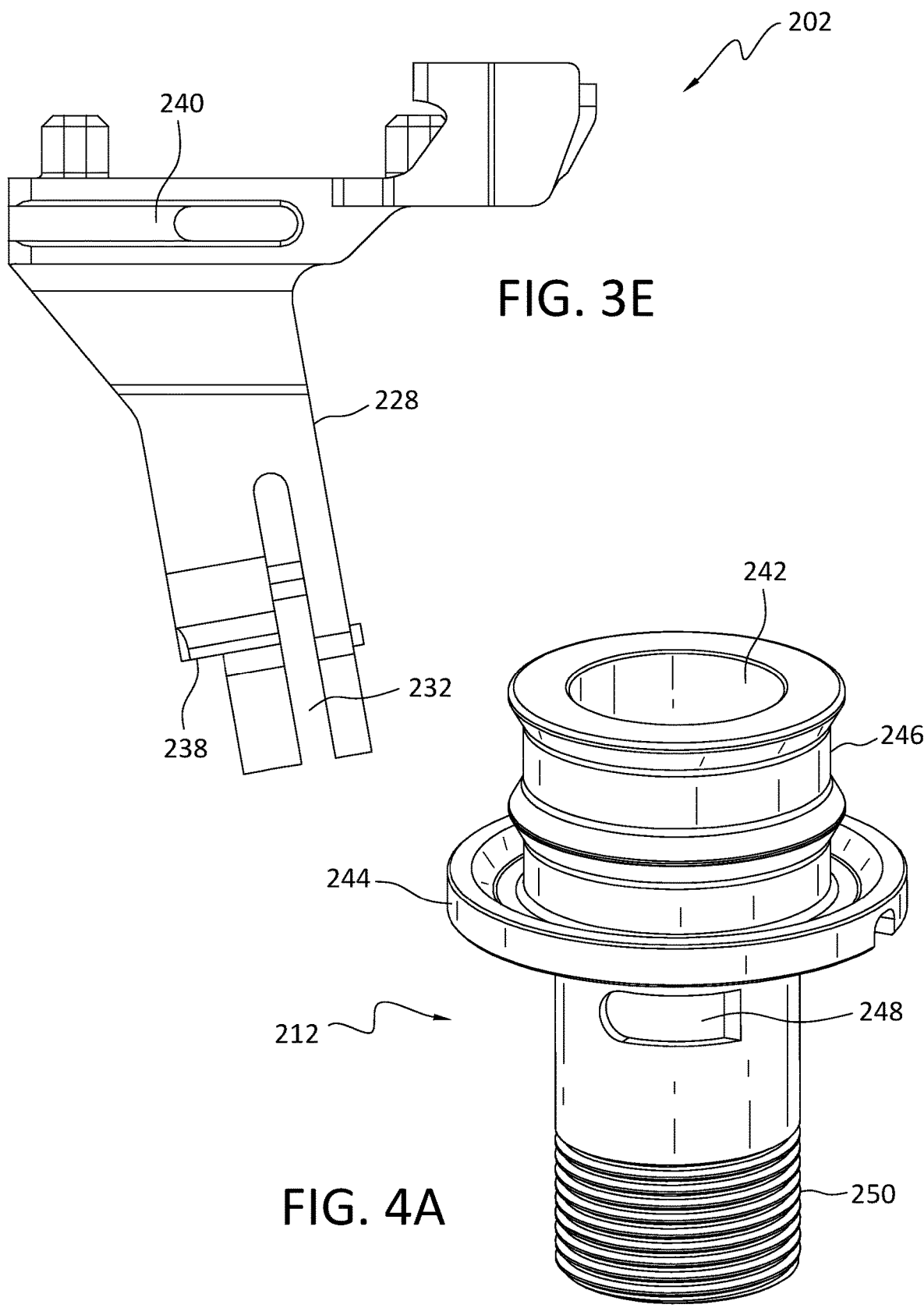

MODULAR ROBOT CONNECTOR

TECHNICAL FIELD

Various exemplary embodiments disclosed herein relate to modular robot connectors.

BACKGROUND

A computer-assisted surgical system may include a robot arm, controller, and navigational system. Robotic or robot-assisted surgeries have many associated advantages, particularly in terms of precise placement of surgical tools and/or implants. For example, in surgeries where multiple steps are carried out, such as, by way of a non-limiting example, a drill, tap, and screw technique, the conceptual ability of a robotic surgical system to track a position and/or orientation of a first tool to achieve a desired trajectory and then later precisely return to the same position and/or orientation with a second tool at a desired trajectory is particularly advantageous.

However, changes introduced into the computer-assisted surgical system, such as by changing end effectors for the robot arm, may increase the chance of misalignment or introduce other sources of error. By way of a nonlimiting example, errors can result in a variety of disadvantages, including loss of sterility by damaging the drape. Accordingly, there is a need for systems, devices, and methods that improve computer-assisted surgical systems, for example, by developing end effectors that are adapted to removably retain a number of different tools (e.g., a series of tools for use in a procedure) without affecting navigational precision.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a robot connector, including: a connector configured to connect to a mounting surface of a robot; a guiding insert that is compressible, wherein the guiding insert has an opening configured to receive a guide tube; a guide tube holder with an opening wherein the guide tube is attached to the connector and the opening is configured to receive the compressible guiding insert; and a locking mechanism configured to lock the guiding insert and the guide tube to the connector.

Various embodiments are described, wherein the guiding insert includes a collar and a tube.

Various embodiments are described, wherein the tube includes a plurality of tube slits.

Various embodiments are described, wherein the collar includes a plurality of collar slits.

Various embodiments are described, wherein the tube includes a plurality of tube segments separated by the plurality tube slits.

Various embodiments are described, wherein adjacent pairs of tube segments are connected to different collar segments at a proximal end and to one another by an arm connector at a distal end.

Various embodiments are described, wherein the slits separating the adjacent pairs of tube segments align with the collar slits.

Various embodiments are described, wherein the locking mechanism includes a locking lever and a retaining clip, wherein the locking lever moves an end of the retaining clip into contact with the guiding insert when the locking lever is rotated.

Various embodiments are described, wherein the guide tube holder includes an opening configured to receive the end of the retaining clip.

Further various embodiments relate to a robot connector, including: a guiding insert with a first locking mechanism and an opening, wherein the opening is configured to receive a guide tube and the first locking mechanism is configured to lock the guide tube to the guiding insert; and an end effector configured to be connected to the robot, wherein the end effector includes: an opening configured to receive the guiding insert; and a second locking mechanism configured to lock the guiding insert to the end effector.

Various embodiments are described, wherein the second locking mechanism includes a locking lever configured to engage and lock the guiding insert through a locking lever opening in the end effector.

Various embodiments are described, wherein the guiding insert includes a locking groove configured to engage the locking lever.

Various embodiments are described, wherein the second locking mechanism includes a locking ring configured to engage and lock the guiding insert when the locking ring is rotated.

Various embodiments are described, wherein the locking ring includes a locking protrusion configured to engage a locking edge of a locking groove in the guiding insert.

Various embodiments are described, wherein guiding insert includes a release surface configured to align with the locking protrusion so that the guiding insert may be separated from end effector.

Various embodiments are described, including a method of using the robot connector as described above, including: attaching the connector to the robot over a drape; selecting a first guiding tube associated with a first surgical step based upon the size of a first surgical tool used in the first surgical step; inserting a first guiding insert associated with the first selected guiding tube in the guide tube holder; inserting the selected first guiding tube in the first guiding insert; and locking the first guiding insert and first guiding tube to the connector using the locking mechanism.

Various embodiments are described, further including; unlocking the first guiding insert and first guiding tube from the connector using the locking mechanism; removing the selected first guiding tube and the first guiding insert from the connector; selecting a second guiding tube associated with a second surgical step based upon the size of a second surgical tool used in the second surgical step; inserting a second guiding insert associated with the second selected guiding tube in the guide tube holder; inserting the selected second guiding tube in the second guiding insert; and locking the second guiding insert and second guiding tube to the connector using the locking mechanism.

Various embodiments are described, including a method of using the robot connector as described above, including: attaching the end effector to the robot over a drape; selecting a first guiding tube associated with a first surgical step based upon the size of a first surgical tool used in the first surgical step; inserting a first guiding insert associated with the first selected guiding tube in the end effector; locking the first guiding insert to the end effector using the second locking mechanism; inserting the selected first guiding tube in the first guiding insert; and locking the first guiding tube to the first guiding insert using the first locking mechanism. Various embodiments are described, further including; unlocking the first guiding insert from the end effector using the second locking mechanism; removing the first guiding insert from the end effector; selecting a second guiding tube associated with a second surgical step based upon the size of a second surgical tool used in the second surgical step; inserting a second guiding insert associated with the second selected guiding tube in the end effector; locking the second guiding insert to the end effector using the second locking mechanism; inserting the selected second guiding tube in the second guiding insert; and locking the second guiding tube to the second guiding insert using the first locking mechanism.

Various embodiments are described, further including; unlocking first guiding tube from the first guiding insert using the first locking mechanism; and removing the first guiding tube from the first guiding insert.

BRIEF DESCRIPTION OF THE DRAWINGS

In order to better understand various exemplary embodiments, reference is made to the accompanying drawings in the following listing.

FIGS. 3A-E illustrate top perspective, bottom perspective, bottom, top views, and side views of an embodiment of upper body.

FIGS. 4A-C illustrate top perspective, bottom perspective, and side views of an embodiment of guide tube holder.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1A:
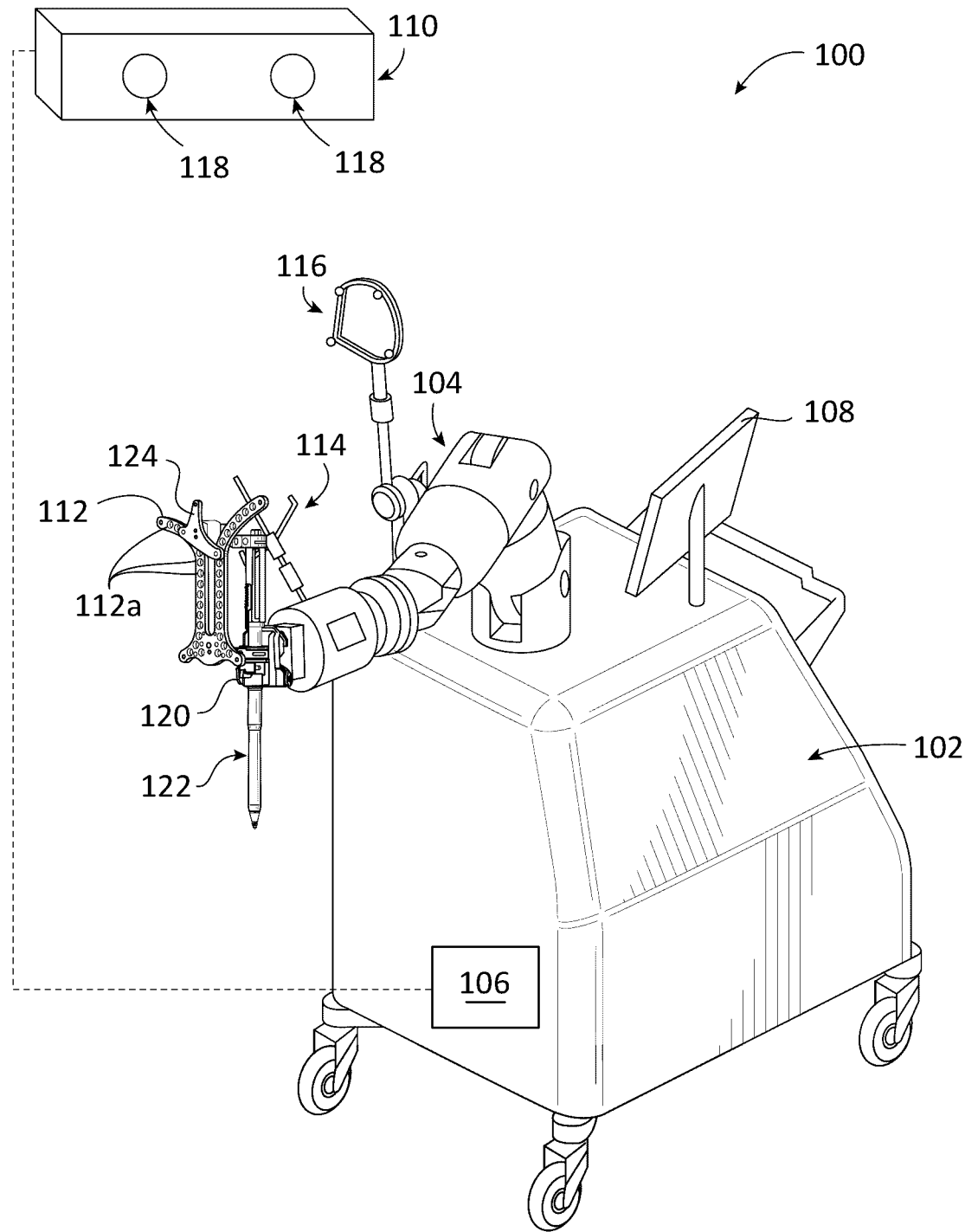
FIG. 1A illustrates an overview of a computer-assisted surgical system.

FIG. 1A illustrates an overview of a computer-assisted surgical system 100. A surgical robot base 102 supports a robot arm 104. The base 102 is depicted as a mobile base, but stationary bases are also contemplated. The robot arm 104 includes a plurality of arm segments connected by rotatable or otherwise articulating joints and may be moved by actuation of the joints, locked in place, etc. The robot arm 104 is able to move in all six degrees of freedom during a surgical procedure. The robot arm 104 may be configured for incremental changes (e.g., in each of the six degrees of freedom) to ensure the necessary precision during surgery. The robot arm 104 may actively move about the joints to position arm in a desired position relative to the patient (not depicted), or the robot arm may be set and locked into a position. For example, the present disclosure is contemplated to include use of tools by surgical robots, by users with some degree of robotic assistance, and without involvement of surgical robots or robotic assistance (e.g., once positioned and locked).

A control unit or controller 106 controls the robot arm 104 and associated navigational system(s). The controller 106 typically includes a power supply, AC/DC converters, motion controllers to power the motors of the actuation units in each joint, fuses, real-time interface circuits, and other components conventionally included in robotic surgical systems. An external device 108 may communicate with the controller 106. The external device 108 may be a display, a computing device, remote server, etc., configured to allow a surgeon or other user to input data directly into the controller 106. Such data may include patient information and/or surgical procedure information. The external device 108 may display information from the controller 106, such as alerts. Communication between the external device 108 and the controller 106 may be wireless or wired.

The system 100 may also include a navigational system that includes a tracking unit 110, such that the relative pose or three-dimensional position and orientation of fiducials attached to a plurality of the navigational system navigation arrays (e.g., a navigation array 112, a navigation array 114, and an optional navigation array 116 (and/or other navigation arrays)) may be tracked in real time and shared with the controller 106 for planning or control. The tracking unit 110 may measure the relative motions between any and all components coupled to navigation arrays in a known manner. Tracking may be performed in a number of ways, e.g., using stereoscopic optical detectors 118, ultrasonic detectors, radio frequency (RF) location detectors, sensors configured to receive position information from inertial measurement units, etc. Tracking in real time, in some embodiments, means high frequencies greater than twenty Hertz, in some embodiments in the range of one hundred to five hundred Hertz, with low latency, and in some embodiments less than five milliseconds. Regardless of how it is gathered, position and orientation data may be transferred between components (e.g., to the controller 106) via any suitable connection, e.g., with wires or wirelessly using a low latency transfer protocol. The real-time controller 106 may carry out real-time control algorithms at a reasonably high frequency with low additional latency to coordinate movement of the system 100. The tracking unit may also include cameras, or use the stereoscopic optical detectors 116, to detect, for example, characteristics of end effectors attached to the robot arm 104.

Fiducials (not depicted) of the navigational system may be attached to the navigation arrays (e.g., the navigation array 112, the navigation array 114, and/or optional navigation array 116 (and/or other navigation arrays)), for example, via a plurality of mounting points 112*a* (e.g., of the navigation array 112). Fiducials may be arranged in predetermined positions and orientations with respect to one another. The fiducials may be aligned to lie in planes of known orientation (e.g., perpendicular planes, etc.) to enable setting of a Cartesian reference frame. The fiducials may be positioned within a field of view of a navigation system and may be identified in images captured by the navigation system. The fiducials may be single-use reflective navigation markers. Exemplary fiducials include infrared reflectors, light emitting diodes (LEDs), radio frequency (RF) emitters, spherical reflective markers, blinking LEDs, augmented reality markers, and so forth. The navigation arrays may be or may include an inertial measurement unit (IMU), an accelerometer, a gyroscope, a magnetometer, other sensors, or combinations thereof. The sensors may transmit position and/or orientation information to a navigation system, e.g., to a processing unit of the navigation system, which may be, for example, the controller 106.

The navigation array 114 may be mounted on the robot arm 104 to determine a position of the robot arm or a distal portion thereof (indicative of an end effector position or with reference to a difference from a position of the navigation array 112). The structure and operation of the navigation array 114 may vary depending on the type of navigation system used. In some embodiments, the navigation array 114 may include one or more sphere-shaped or other fiducials for use with an optical navigation system, for example, a robotic navigation system. The navigation system may facilitate registering and tracking of the position and/or orientation of the navigation array 114 and, by extension, an end effector 120 and its relative distance to other objects in the operating room, e.g., a patient, a surgeon, etc.

The end effector 120 may be coupled to the robot arm 104, for example, via an end plate locked by a lever. As can appreciated, there should be no play between the end effector 102 and robot arm 104. While the system 100 may utilize end effectors of various shapes, sizes, and functionalities, the depicted end effector has an aperture for removably retaining a tool 122. In some embodiments, the end effector 120 is part of a Universal Navigation Adaptor Set (UNAS) and the navigation array 112 is mounted to the end effector. Advantageously, the end effector 120 may be adapted to retain a series of tools including the tool 122 (for example, a series of tools used in a particular surgical procedure).

The tool 122 may be placed in a guide (e.g., or another aperture) of the end effector 120. A locking mechanism of the end effector 120 may secure the tool 122 in place. The locking mechanism may be a slider locking mechanism or other feature. The tool 122 as depicted is a dilator, but it is understood that the tool may have at a distal end: a probe, a dilator tip (e.g., sharp or blunt), a cutting instrument, a tap, a screw, etc. The cutting instrument may be, for example, a drill, saw blade, burr, reamer, mill, scalpel blade, or any other implement that could cut bone or other tissue and is appropriate for use in a given operation.

In some embodiments, the navigation array 112 may be attached to the robotic connector (e.g., end effector 120, such as to an exterior surface of the guide tube) and may be described as a Robotic array (R-array). A complementary small array 124 (e.g., an S-array) is attached to both the R-array (e.g., navigation array 112) and the tool 122. The R-array (e.g., navigation array 112) may have a universal fit shape with a plurality of mounting points 112*a* for fiducials and the S-array 124. The S-array 124 may, in some embodiments, be one of a plurality of relatively smaller arrays, each with a specific shape to be used with a predetermined tool, such as to achieve a proper depth or some other characteristic for the associated tool. For example, the R-array may exhibit high precision and define the trajectory, and the S-array may be of relatively lower accuracy and define a single point (such as a tip of an instrument) which is projected on the trajectory of the R-Array (e.g., for depth perception). In some embodiments, the R-array is attached to a coupling. The individual S-arrays may be attached to instruments, at such points configured for the predetermined tool (e.g., for depth perception (e.g., pursuant to a Drill, Tap, Screw procedure)). In some embodiments, the R-array (attached to a robot arm) may return to a former position (as determined by the controller 106) while various S-arrays may be in different positions, e.g., a position appropriate for the predetermined tool.

Figure 1B:
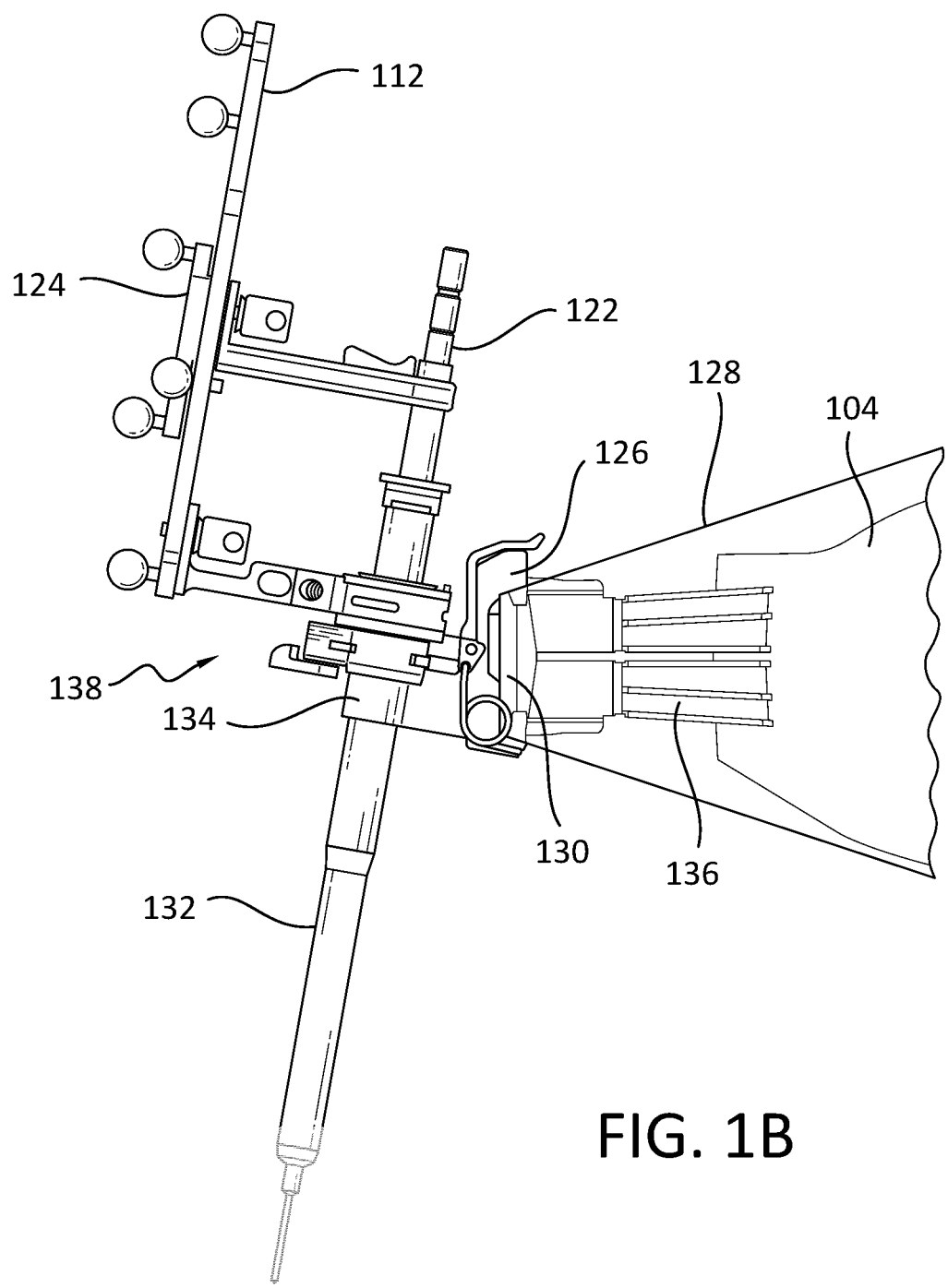
FIG. 1B illustrates a side view of a side view of a modular robot connector system.
Figure 1C:
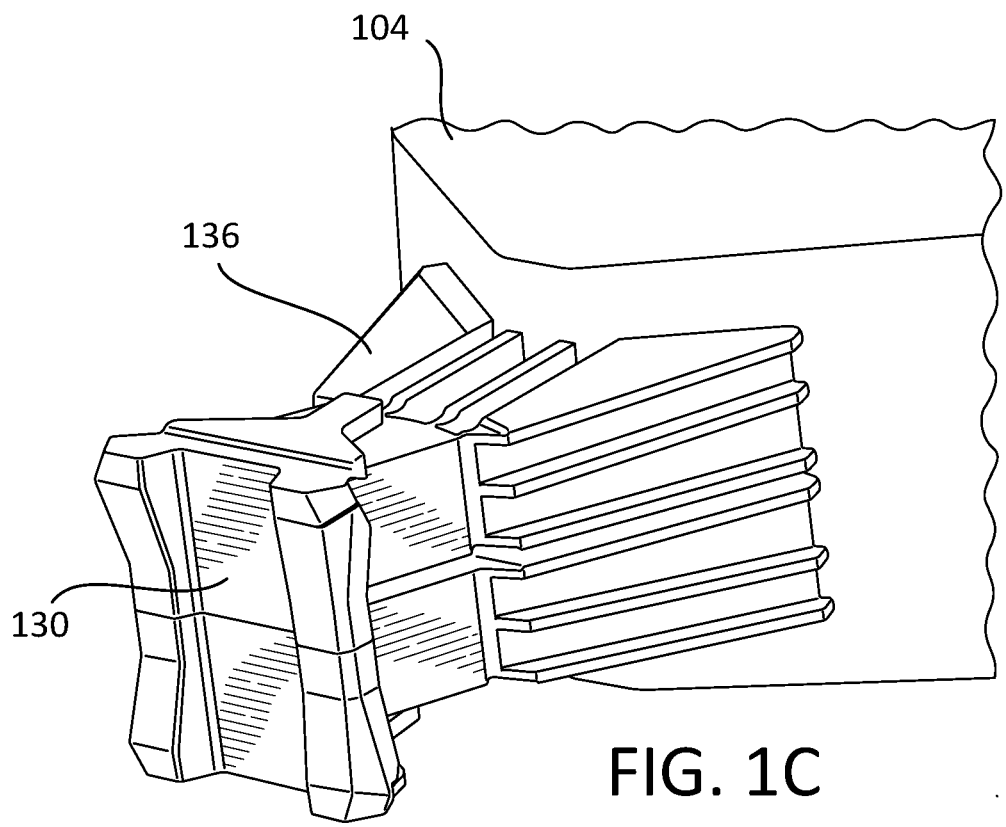
FIG. 1C illustrates a perspective view of the mounting interface attached to mounting structure which is connected to the robot arm.
Figure 1D:
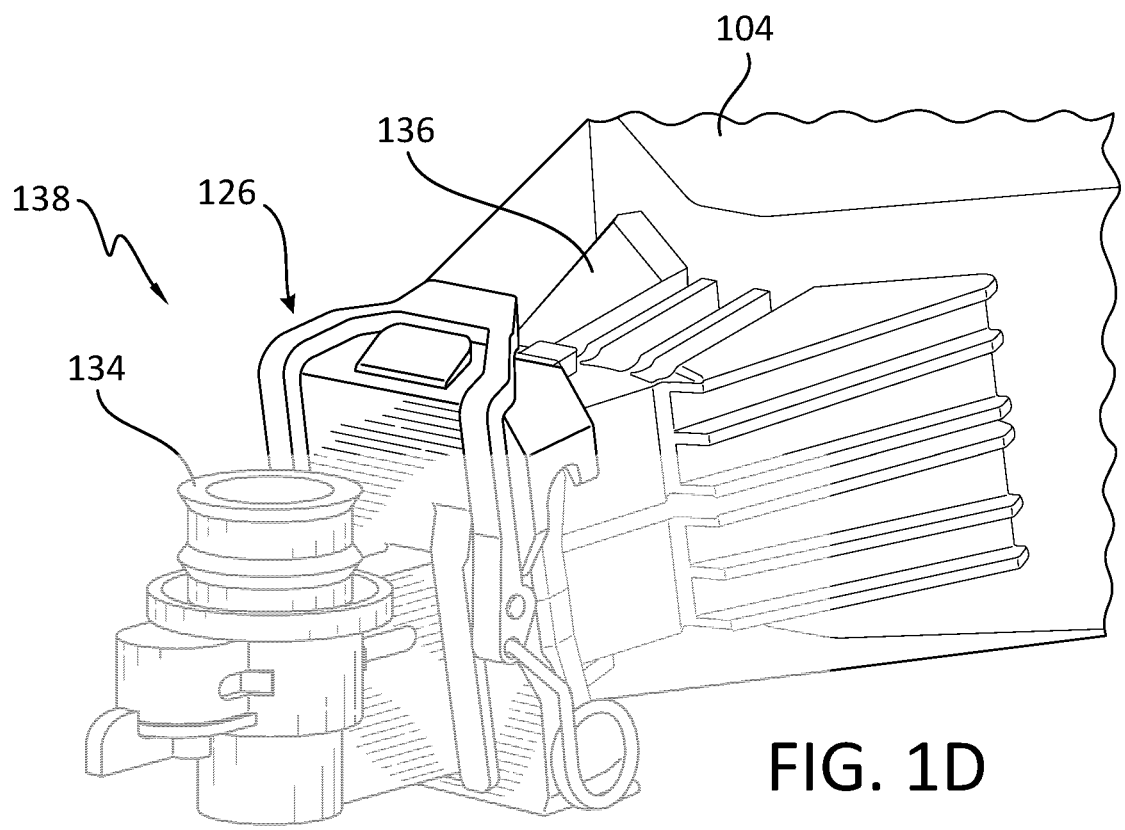
FIG. 1D illustrates a perspective view of robot connector with guide tube holder connected to the mounting interface and mounting structure.
Figure 1E:
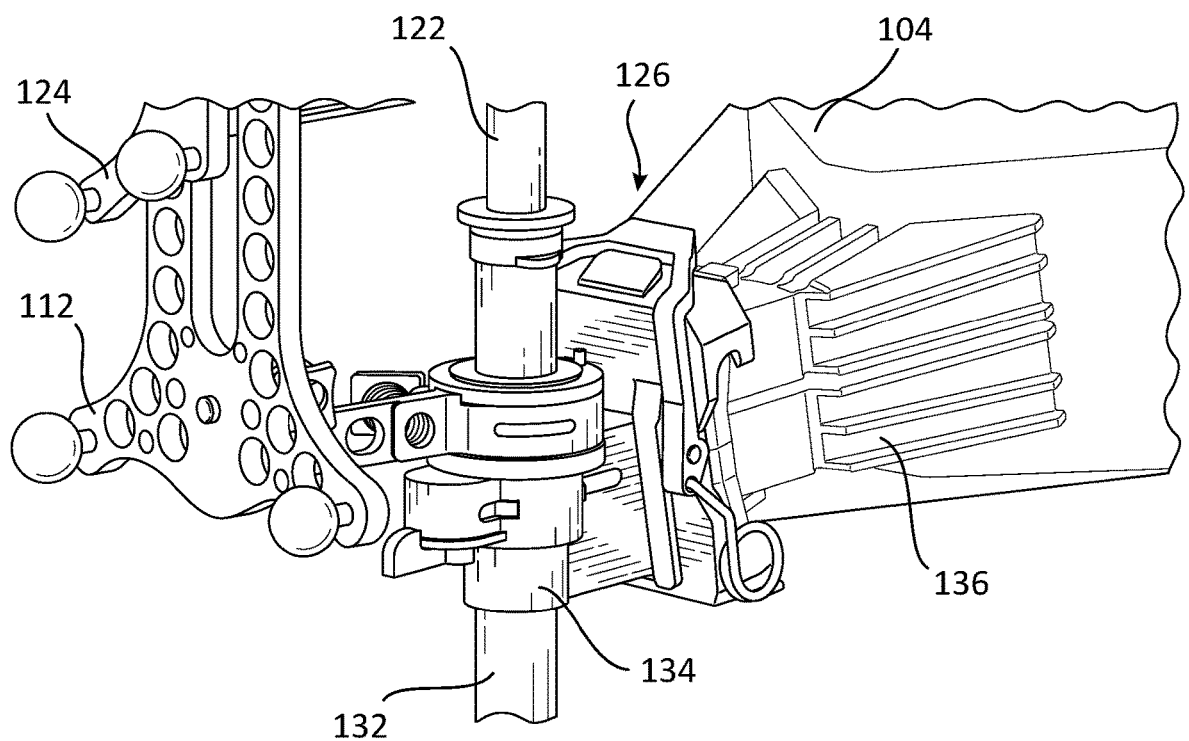
FIG. 1E illustrates a close-up perspective view of the robot connector connected to the mounting interface.
Figure 2A:
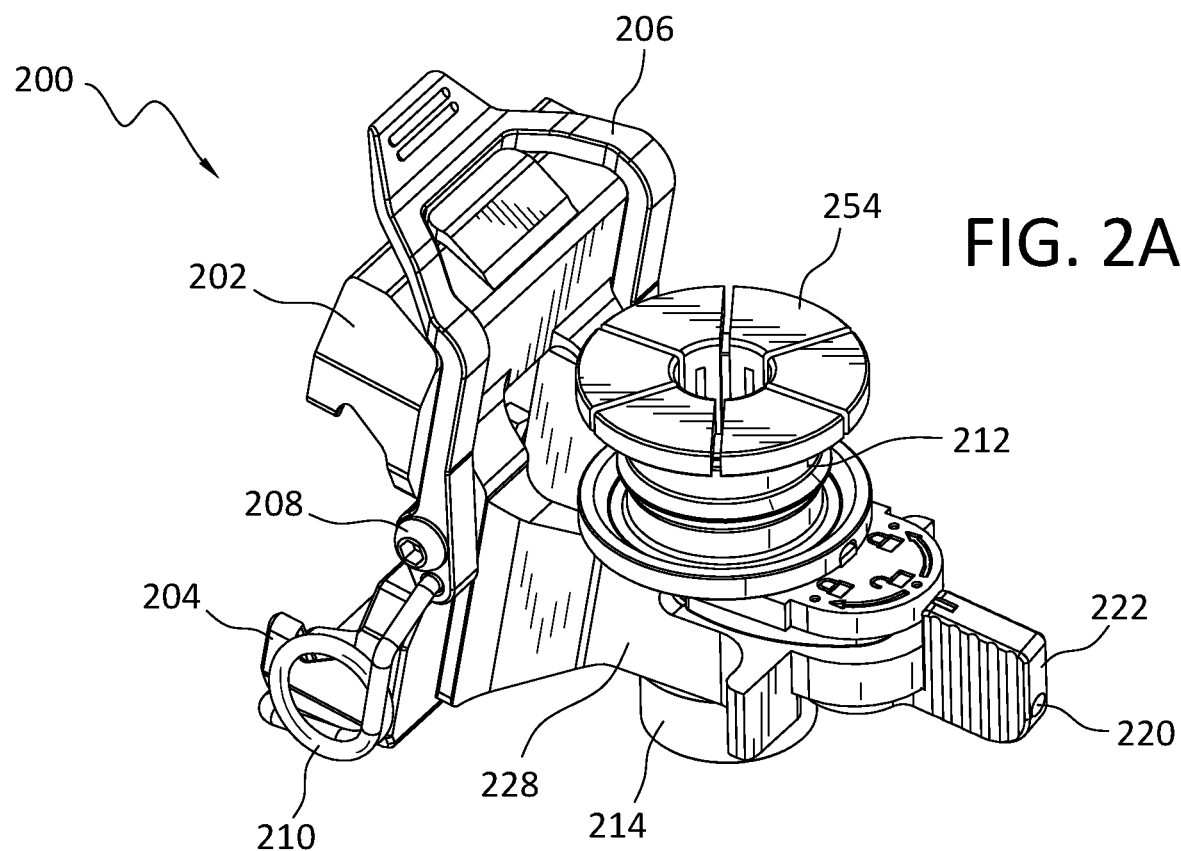
FIGS. 2A-E illustrate top perspective, bottom perspective, side cross-sectional, top cross-sectional, and exploded views of an embodiment of a robotic connector.
Figure 2B:
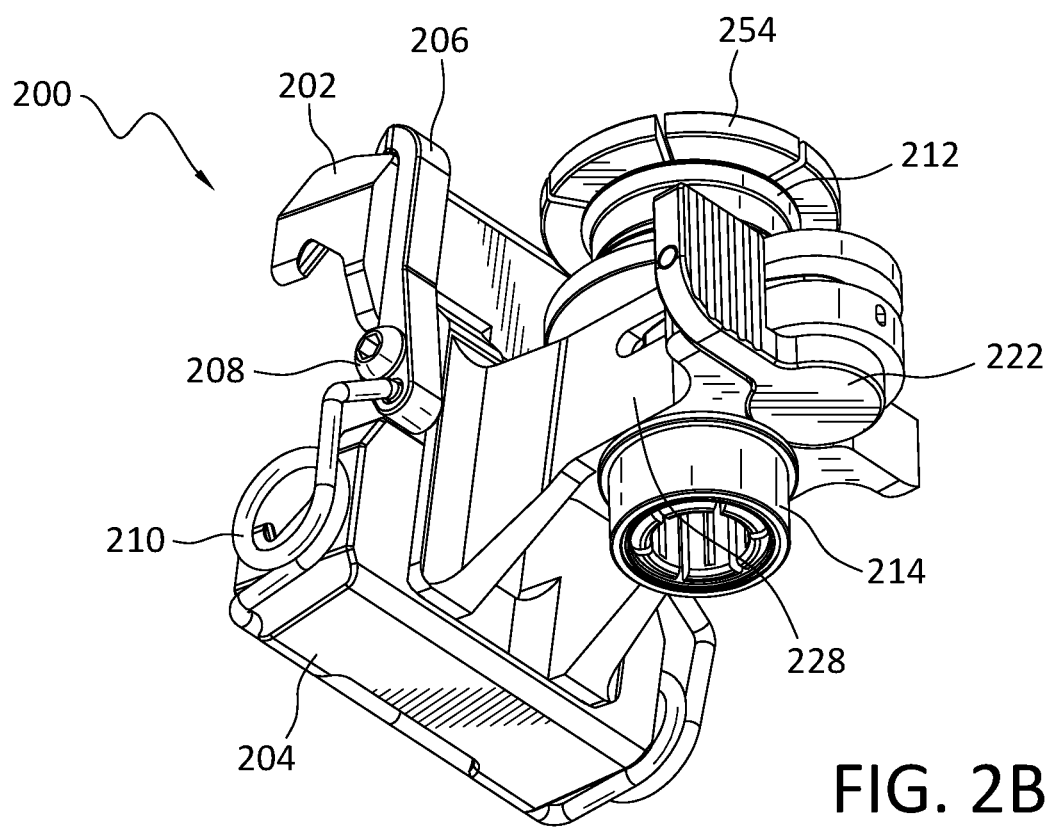
Figure 2C:
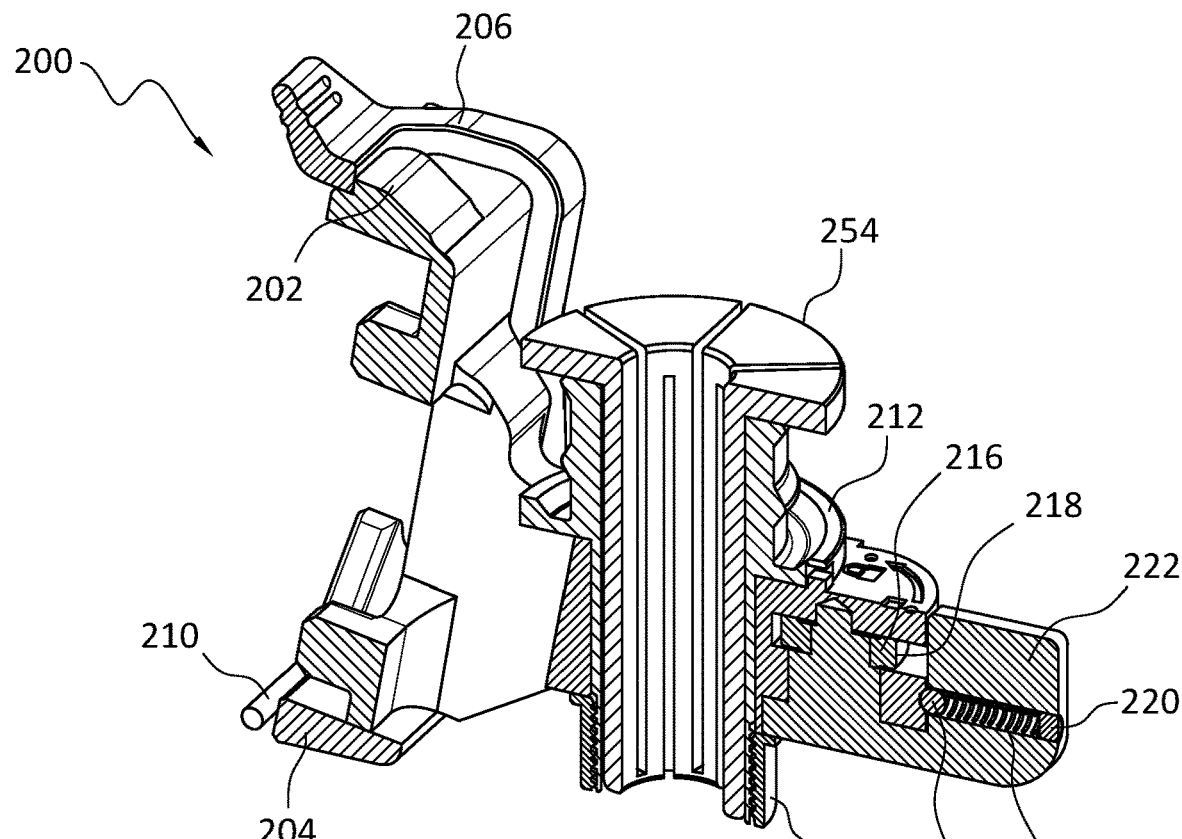
Figure 2D:
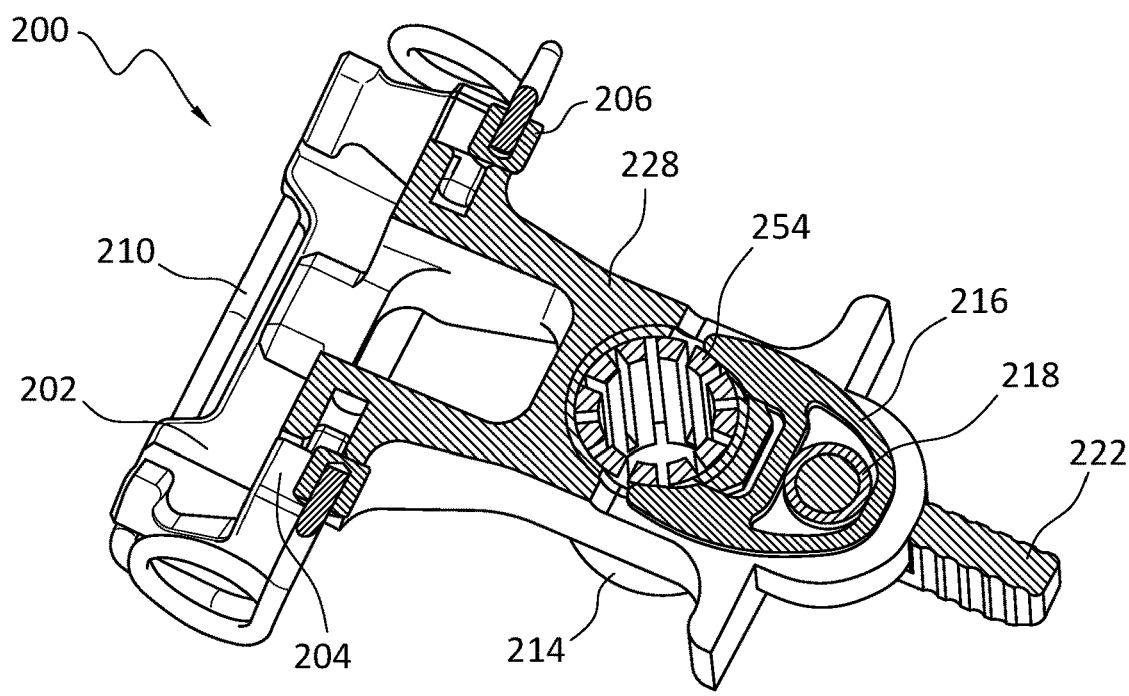
Figure 2E:
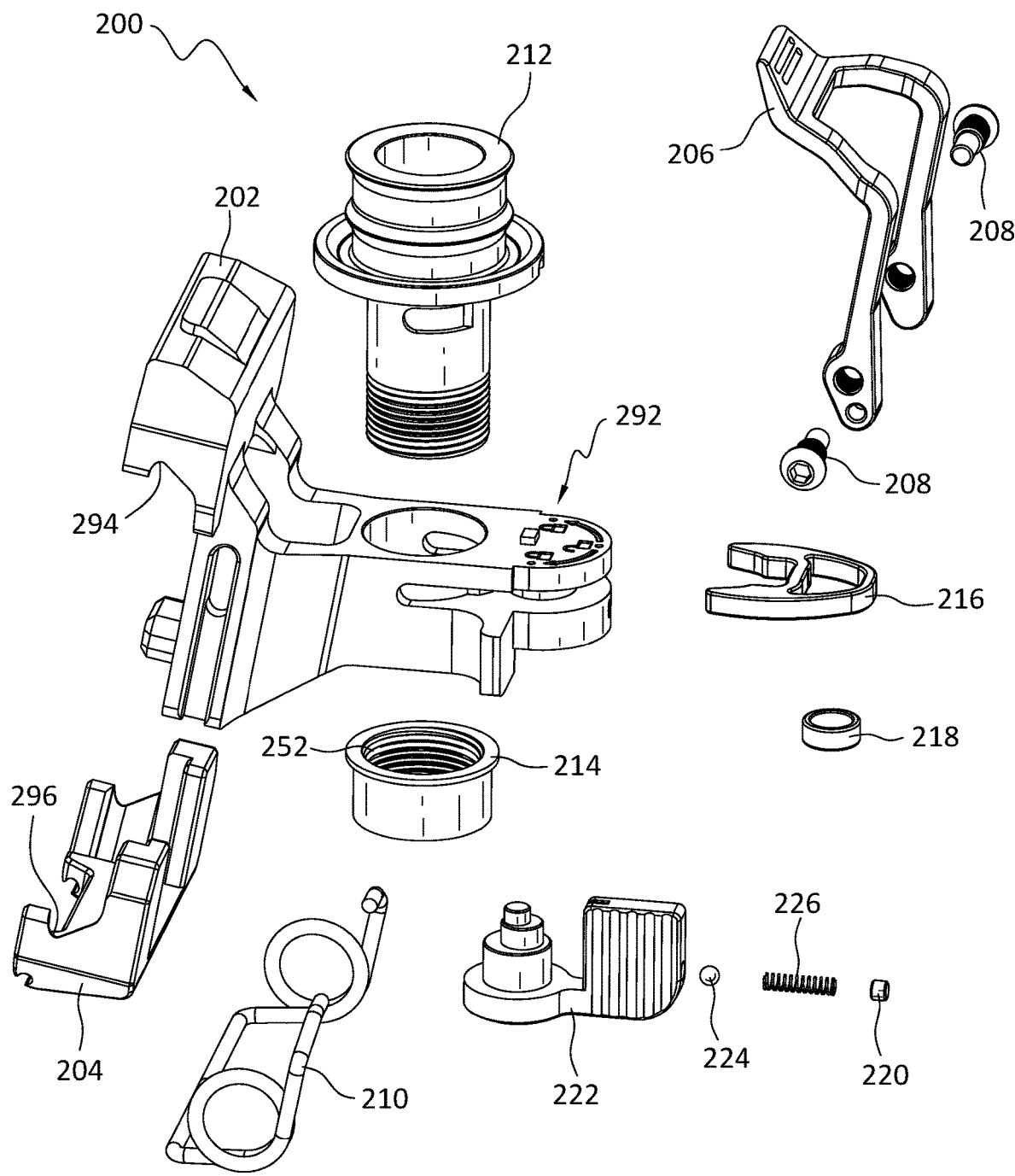
Figure 3A:
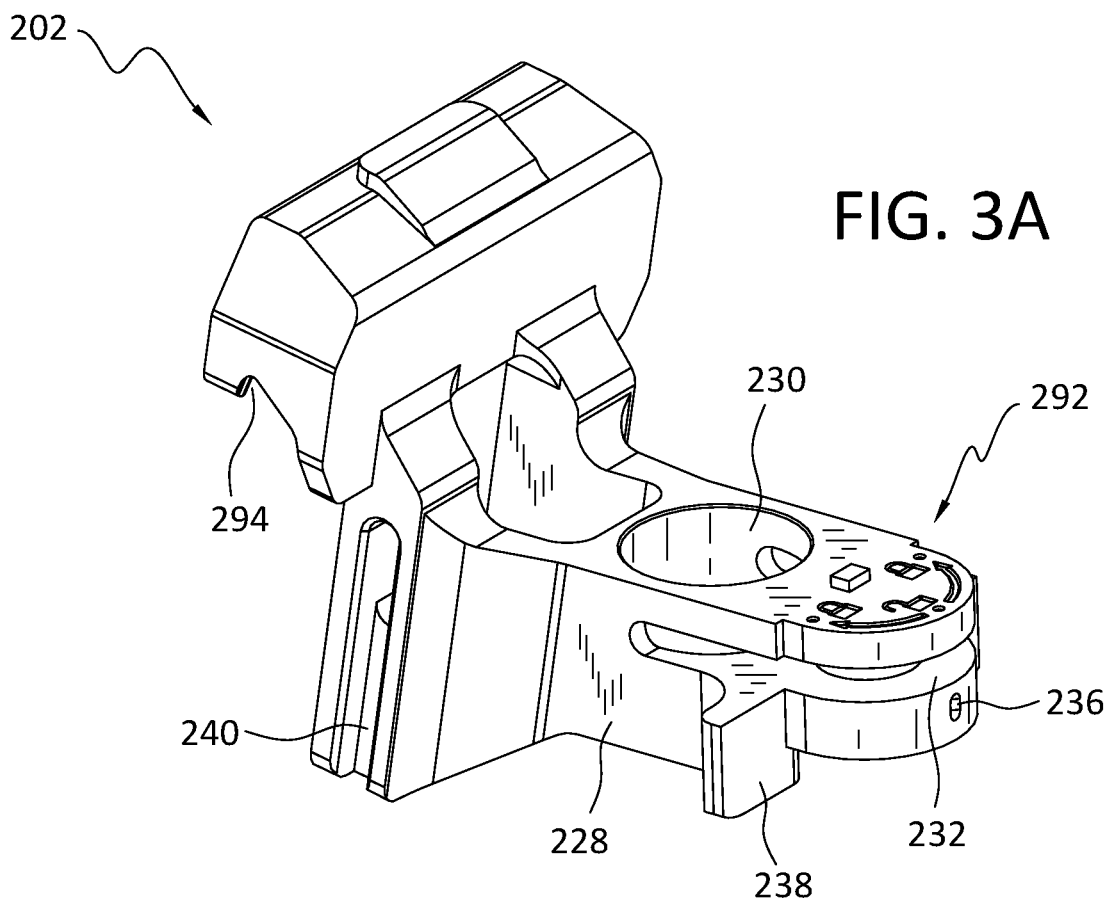
Figure 3B:
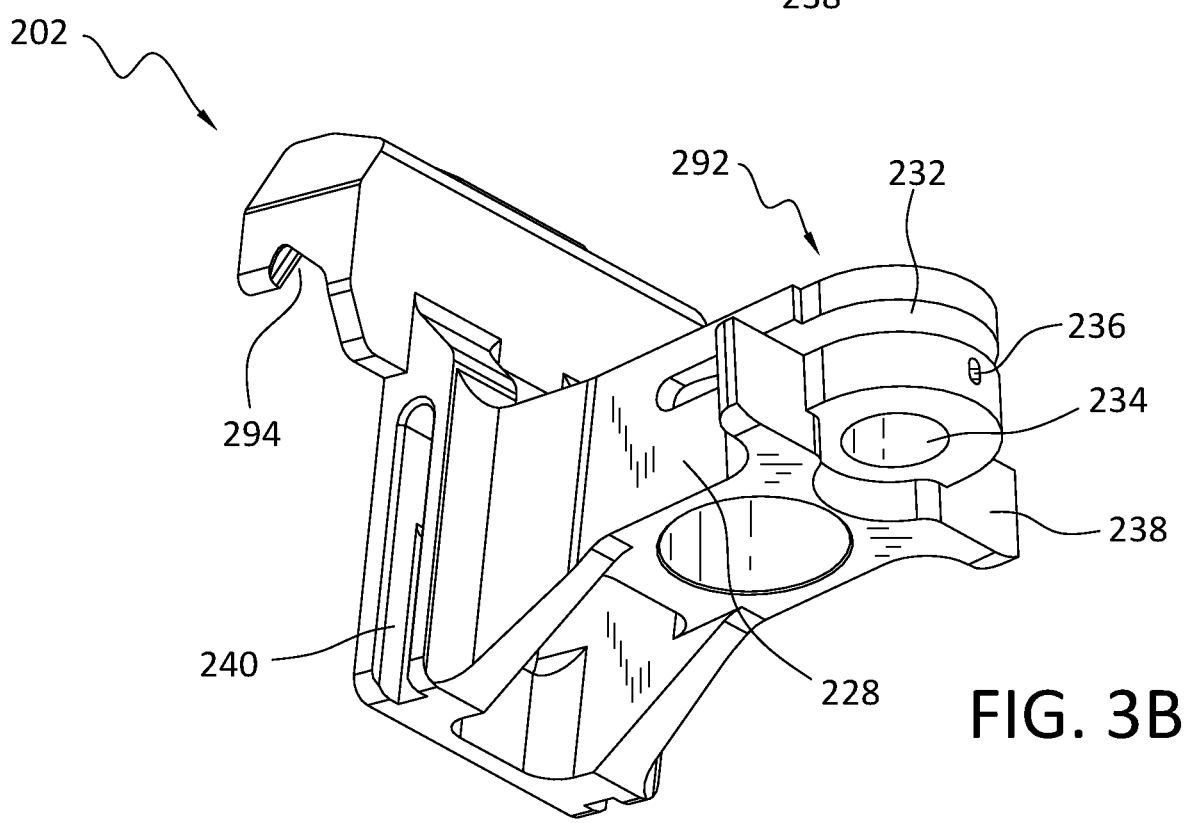
Figure 3C:
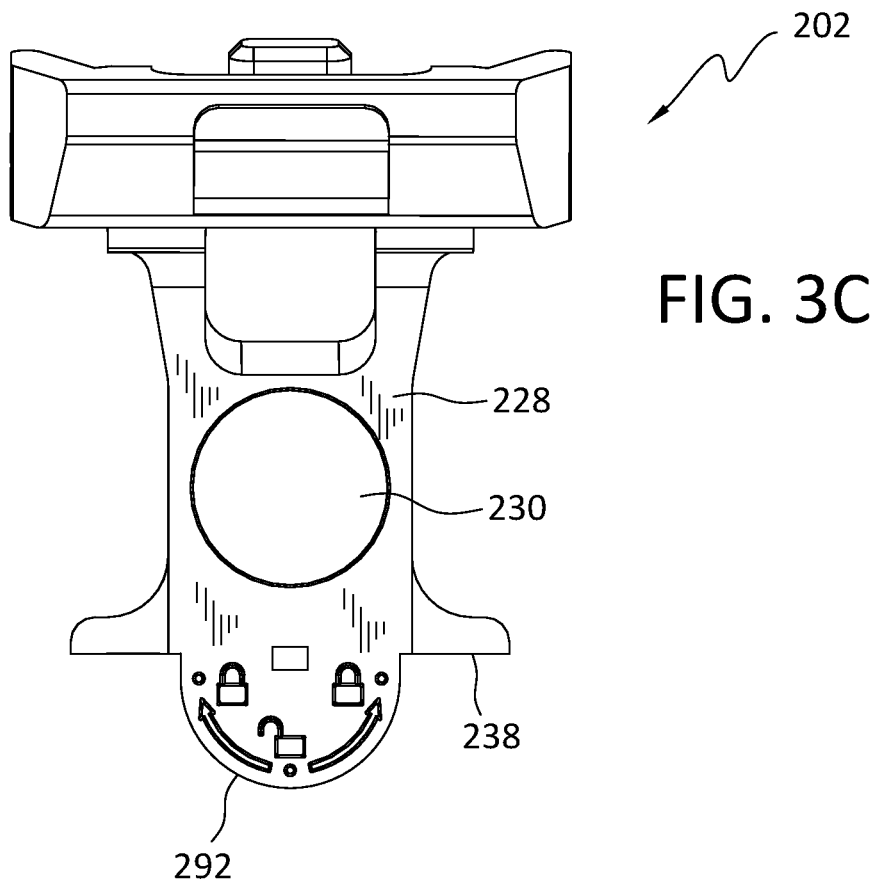
Figure 3D:
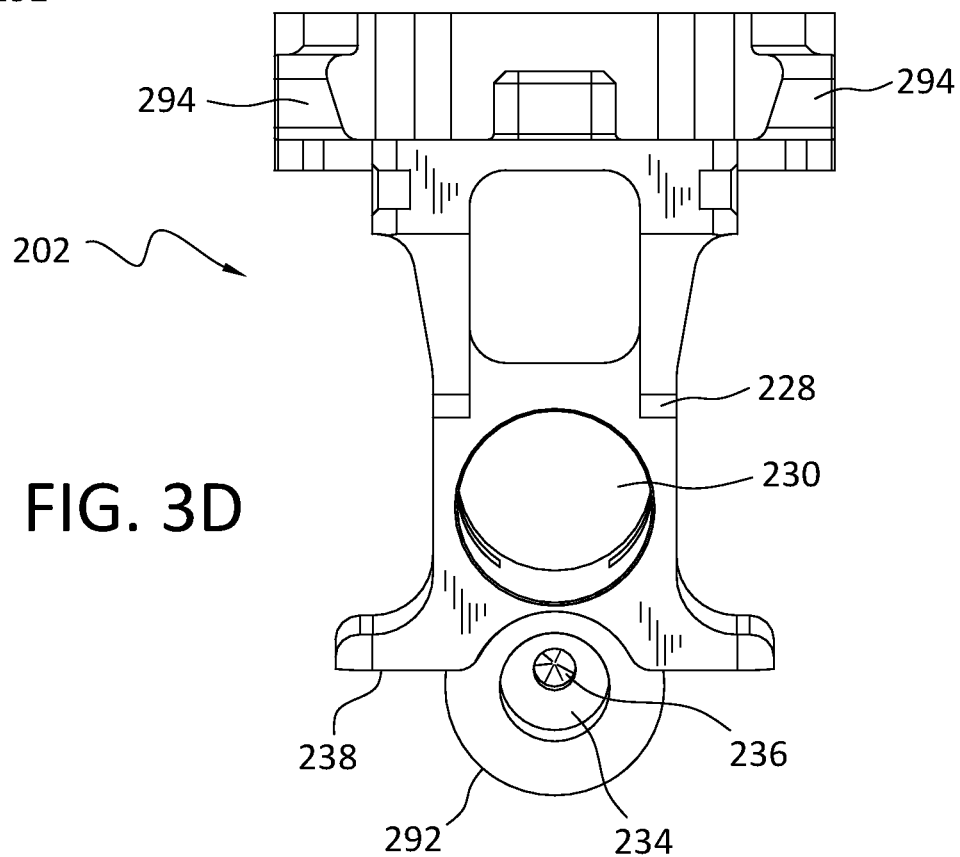

FIG. 1B illustrates a side view of a side view of a modular robot connector system. FIG. 1C illustrates a perspective view of the mounting interface 130 attached to mounting structure 136 which is connected to the robot arm 104. FIG. 1D illustrates a perspective view of robot connector 126 with guide tube holder 134 connected to the mounting interface 130 and mounting structure 136. FIG. 1E illustrates a close-up perspective view of the robot connector 126 connected to the mounting interface 130. The modular robot connector system 138 includes the robot connector 126, guide tube holder 134, and guide tube 132. The robot connector 126 includes the guide tube holder 134, and the guide tube holder 134 has a central opening that accepts the guide tube 132 therethrough. The central opening of the guide tube holder 134 is sized to be the same as the outer surface of the guide tube 132. The guide tube 132 is then sized based upon the size of the implant (e.g., screws) or tools to be used in the surgery.

A drape 128 is placed over the mounting interface 130, mounting structure 136, and the robot arm 104 to provide a sterile environment for the surgery. The robot connector 126 is then clamped to the mounting interface 130 over the drape 128.

For the modular robot connector system 138 illustrated in FIGS. 1A-D, when a different sized implant or tool is required for the surgery, a different modular robot connector system 138 has to be used. Hence, the current modular robot connector system 138 and it associated guide tube 132, navigation array 112, and robot connector 126 need to be swapped out for a modular robot connector system 138 that can accommodate a guide tube 132 of a different size. Embodiments of modular robot connector systems will be described below that allow for only a different guiding insert to be used with different guide tubes that are associated with different sized implants and tools that are used during the surgery.

An example use of the computer-assisted surgery in spinal surgery will now be described. In spinal surgery, screws may need to be placed at various locations along the spine. For example, in posterior fixation of the spine, there is only a very narrow corridor through which to place the screw as dictated by the pedicle. In such situations the use of the computer-assisted surgical system allows for very precise placement of the screw including both location and orientation of the screw. During a planning stage, the location of the screws is determined and then this planning can be used to control the computer-assisted surgical system to perform the surgery. The steps of the surgery may use tools to drill and tap the bone in preparation for inserting the screw. In order to achieve the planned trajectory a cylindrical guide tube 132 is used to guide the tool to the surface of the bone. As the different tools used may have different sizes, different sizes of guide tube 132 may be used for different steps of the surgery. Further, at various locations along the spine different sized screws may be used resulting in the use of different sized tools that requires the use of a different sized guide tube 132.

As described above various tracking arrays are used to track the location of the various elements of the computer-assisted surgical system relative to the patient. If the end effector that includes the guide tube 132 is swapped out to carry out various steps, this will require that the system be calibrated again. Further, as the end effector is placed over the drape and the mounting interface 130, the removal and attachment of the different end effectors places the drape at risk of damage and may cause a breach in the sterile barrier over the computer-assisted surgical system.

Further, the guide tube 132 needs to be securely connected to the computer-assisted surgical system 100 with very little play. Removing and attaching end effectors affects this aspect of the computer-assisted surgical system 100.

In order to improve the stability of the computer-assisted surgical system 100 the guide tube 132 may be placed against the patient's bone to close the loop of forces in the system. This means that the guide tube 132 needs to be locked to the robot connector. This also helps to create a fixed reference plane on the patient bone surface.

Various embodiments of a robot connector are described below that use a swappable guide tube holder that accepts guide tubes 132 of different sizes. Further, the robot connector locks the guide tube 132 securely in place to assist in stabilizing the system that can improve the accuracy of the system.

FIGS. 2A-E illustrate top perspective, bottom perspective, side cross-sectional, top cross-sectional, and exploded views of an embodiment of a robotic connector. The robotic connector 200 includes upper body 202, lower body 204, clamp lever 206, clamp fasteners 208, and clamp spring 210 that together form a clamping mechanism that clamps the robotic connector 200 to the mounting interface 130. As the clamp lever 206 rotates about clamp fasteners 208, the upper body 202 and lower body 204 slide relative to one another so that clamping features 294, 296 on the upper body 202 and lower body 204, respectively, engage and disengage the mounting interface 130. The upper body 202 and lower body 204 in combination may be a clamp body. The clamp spring 210 biases the clamp lever 206 towards a locked state so that the robotic connector 200 securely clamps to the mounting interface 130.

While a clamping system is described as part of the robot connector, other connector types may be used instead. Examples of such connectors may include screws, bolts, nuts, quarter or half turn locking mechanism, flanged connection, compression fitting, locking mechanisms, etc.

The upper body 202 includes body arm 228 that has body opening 230 (see FIGS. 3A-D). A guide tube holder 212 extends through body opening 230 and is secured to the body arm 228 by guide tube nut 214. A guiding insert 254 may be inserted through guide tube holder 212. The guiding insert 254 may then receive the guide tube 132.

The robotic connector 200 includes a locking mechanism that includes locking lever 222, retaining clip 216, and ring 218. As the locking lever 222 is rotated either clockwise or counterclockwise, the retaining clip 216 moves toward and engages guiding insert 254. Accordingly, the retaining clip 216 locks the guiding insert 254 and guide tube 132 to the robotic connector 200. This locking mechanism ensures that the guide tube 132 is securely attached to the robot arm 104 and that it will not move during surgery. This is important in order to accurately maintain the position of the tool relative to the patient anatomy. For example, as described above, when placing screws in the spine, the guide tube 132 may be placed against the patient's spine. This means that the end of guide tube 132 is at a known location and the contact between the guide tube 132 and the spine provides for a more secure positioning.

The robotic connector 200 may be attached over the drape 128 to the mounting interface 130. Then the guiding insert 254 and its associated guide tube 132 are selected that to allow for a surgical step to be carried out with specific implants and/or tools. The guiding insert 254 is placed in the guide tube holder 212. Then the guide tube 132 may be placed inside the guiding insert 254. In other embodiments, the guide tube 132 may first be placed in the guide tube holder 212 which combination is then placed in the guide tube holder 212. The guide tube 132 provides a stable and accurate corridor for surgical steps to be carried out. When further surgical steps require implants and/or tools with a different size to be used, the surgeon then simply swaps out the current guiding insert 254 and guide tube 132 for another guiding insert 254 and guide tube 132 with the desired size. This is done by rotating the locking lever 222 to unlock the guiding insert 254 and guide tube 132, removing the current guiding insert 254 and guide tube 132, inserting the new guiding insert 254 and 132, and rotating the locking lever 222 to lock the new guiding insert 254 and guide tube 132 to the robotic connector 200.

As a result, multiple steps that require different sized guide tubes 132 may be carried out without removing robotic connector 200 from the mounting interface 130. Instead, only the guiding insert 254 and guide tube 132 need to be swapped out.

Figure 5A:
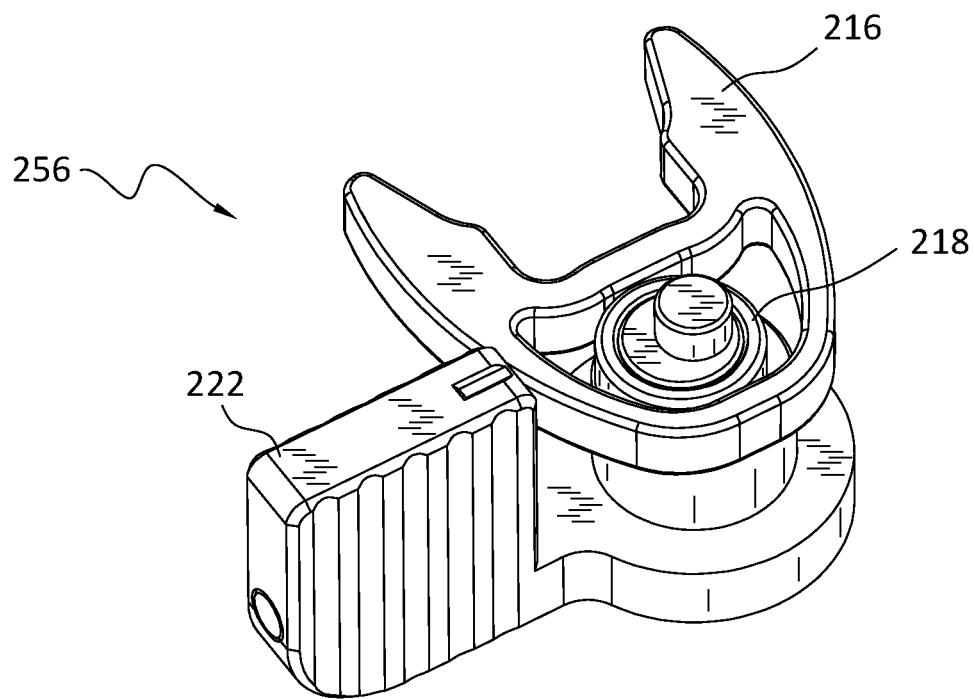
FIGS. 5A-C illustrate top perspective, bottom perspective, and top views of an embodiment of guiding insert lock assembly.
Figure 5B:
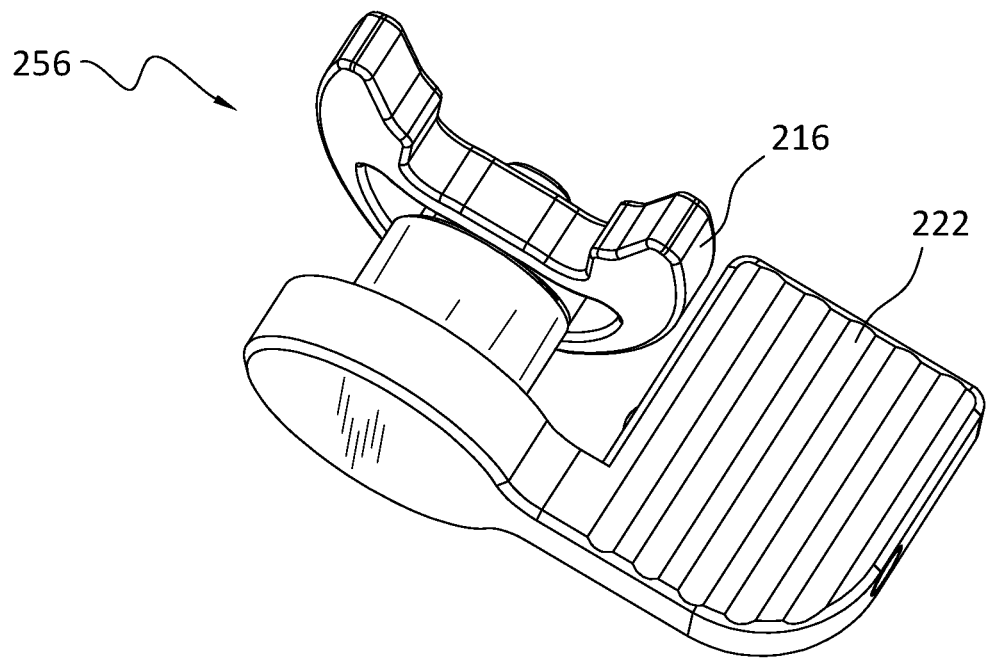
Figure 5C:
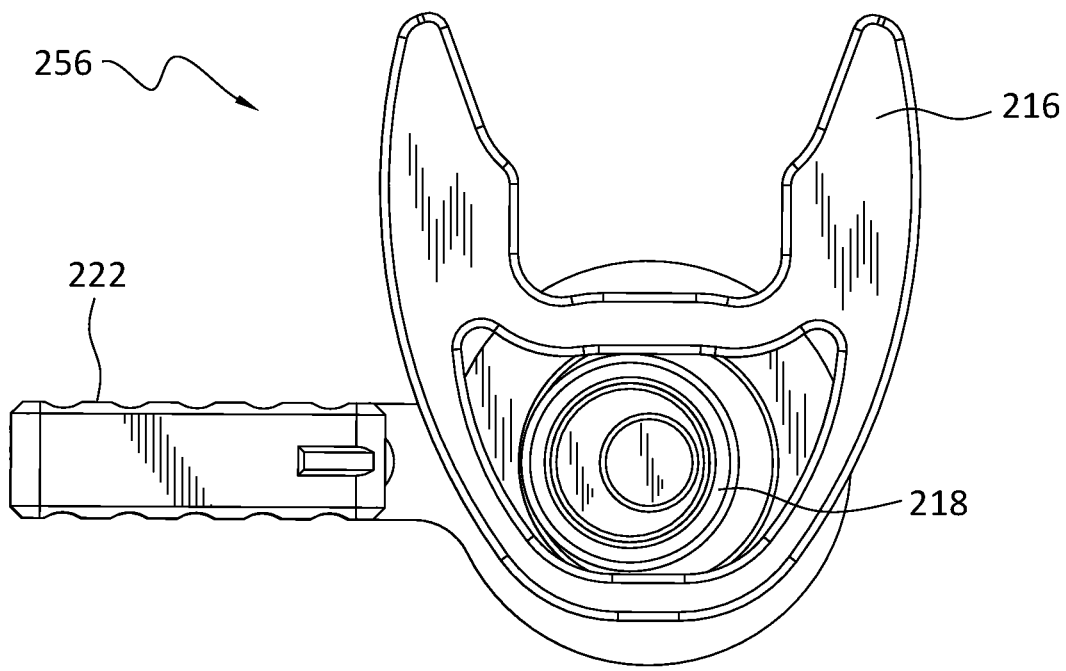

FIGS. 3A-E illustrate top perspective, bottom perspective, bottom, top views, and side views of an embodiment of upper body 202. The upper body 202 includes upper clamping feature 294 that securely engages the mounting interface 130 when the locking mechanism is closed. Body slots 240 on either side of the upper body 202 engage the lower body 204 and allow for the lower body 204 and upper body 202 to move relative to one another as the locking mechanism is locked and unlocked. The upper body 202 includes body arm 228 that extends away from the upper clamping feature 294. The body arm 228 include body opening 230 that receives guide tube holder 212. The body arm 228 includes retaining clip body 292 that houses the guiding insert lock assembly 256 (see. FIGS. 5A-5C). A retaining clip slot 232 extend through the body arm 228 from retaining clip body 292 to the body opening 230. The retaining clip 216 resides in retaining clip slot 232, and the retaining clip 216 is urged towards and away from the body opening 230 by the locking lever 222.

The retaining clip body 292 includes locking lever opening 234 that receives locking lever lower axle 270 (see FIGS. 7A-C) of the locking lever 222. The retaining clip body 292 includes pivot hole 236 that receives locking lever upper axle 274 (see FIGS. 7A-C). When the locking lever 222 is placed in locking lever opening 234 the locking lever lower axle 270 engages locking lever opening 234 and locking lever upper axle 274 engages the pivot hole 236 allowing the locking lever 222 to rotate. The retaining clip body 292 includes locking lever stops 238 that limit the range of rotation of the locking lever 222.

The retaining clip body 292 also includes a locking lever stop 238 that engages a detent ball 224 extending from the locking lever 222. The locking lever stop 238 allows for the locking lever to be left in an open position.

Figure 4B:
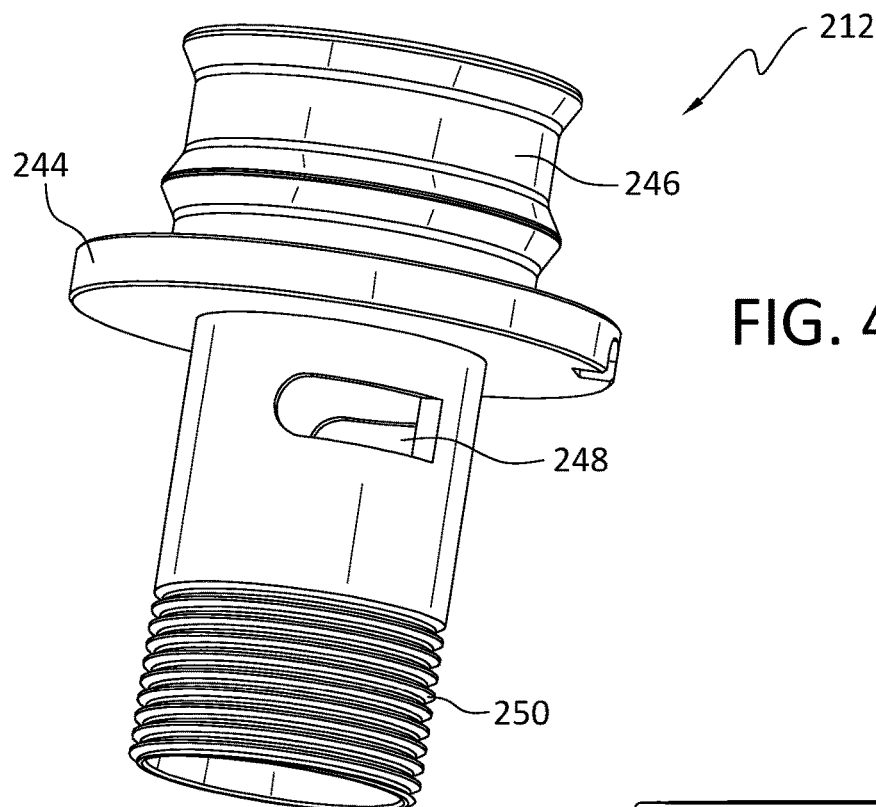
Figure 4C:
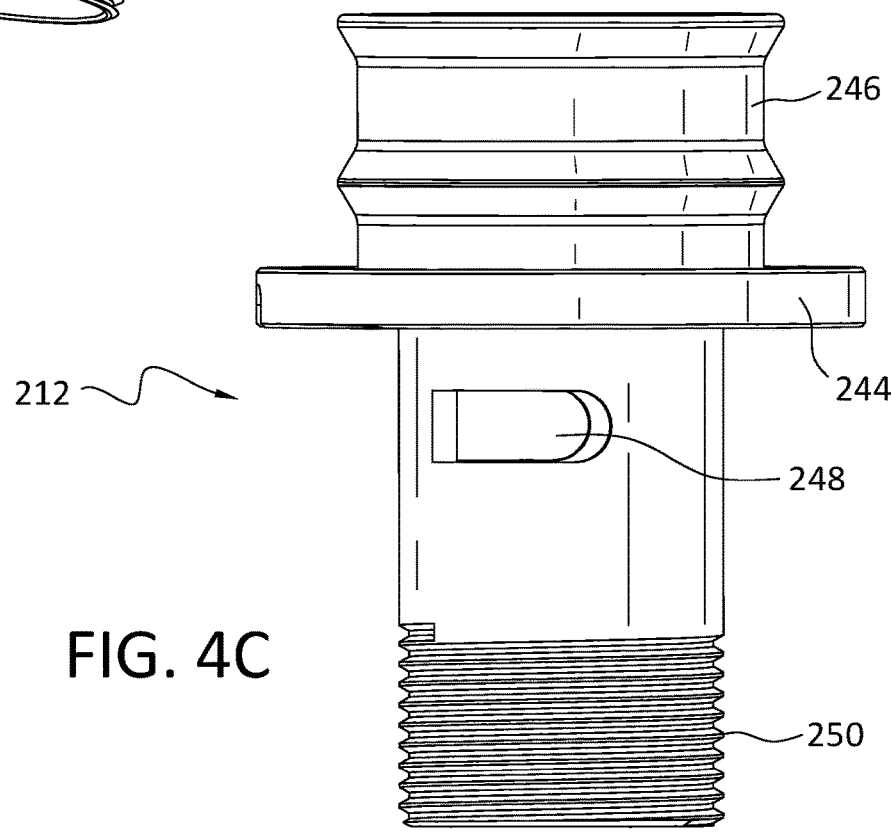

FIGS. 4A-C illustrate top perspective, bottom perspective, and side views of an embodiment of guide tube holder 212. The guide tube holder 212 has a guide tube holder opening 242 that receives the guiding insert 254. The guide tube holder opening 242 is sized to accommodate the largest implant and/or tool that needs to be used in the surgery. The guide tube holder 212 includes collar 244 that provides a stop when guide tube holder 212 is inserted into body opening 230 of upper body 202. Guide tube holder 212 includes guide tube holder threads 250 that interact with guide tube nut threads 252 on guide tube nut 214. The guide tube holder 212 is inserted through body opening 230 and then the guide tube nut 214 is screwed onto guide tube holder 212 secure guide tube holder 212 to the upper body 202. Other methods of fastening the guide tube nut 214 to the guide tube holder 212 may also be used.

Guide tube holder 212 also includes retaining clip opening 248. The ends of retaining clip 216 extend through retaining clip opening 248 in order to engage guiding insert 254. The array mount groove 246 provide a surface to which a navigation array may be attached.

FIGS. 5A-C illustrate top perspective, bottom perspective, and top views of an embodiment of guiding insert lock assembly 256. The guiding insert lock assembly 256 includes retaining clip 216, ring 218, and locking lever 222.

Figure 6A:
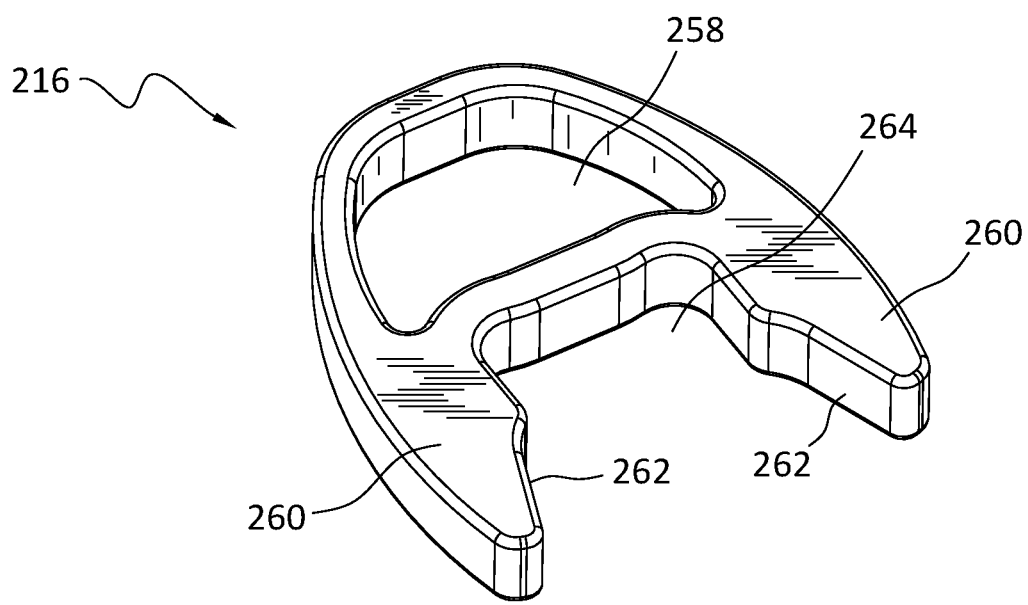
FIGS. 6A and 6B illustrate perspective and top views of an embodiment of retaining clip.
Figure 6B:
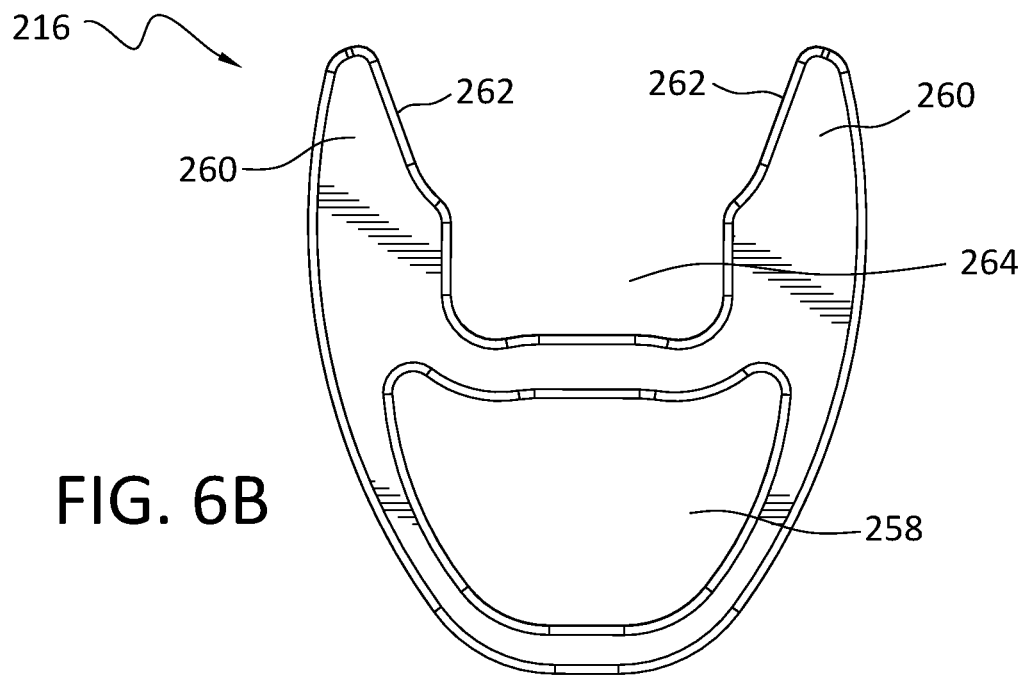

FIGS. 6A and 6B illustrate perspective and top views of an embodiment of retaining clip 216. The retaining clip 216 includes retaining clip opening 258, retaining clip arms 260, retaining clip engagement surfaces 262, and retaining clip inner slot 264. The retaining clip 216 is located in the retaining clip slot 232 where it is able to move in a direction towards and away from the guide tube holder 212 and the guiding insert 254. The retaining clip arms 260 of retaining clip 216 extend into retaining clip openings 248 of the guide tube holder 212 so that the retaining clip engagement surface 262 may contact guiding insert 254. This contact fixes or locks the position of guiding insert 254 and secures the guiding insert 254 to the guide tube holder 212 and hence the robotic connector 200. The retaining clip inner slot 264 accommodates the portion of the guide tube holder 212 that is between the two retaining clip openings 248 and is sized accordingly. The ring 218 is placed around locking lever cam 272 (see FIGS. 7A-C) and this combination is placed in retaining clip opening 258. The ring 218 provides an interface between the locking lever cam 272 and retaining clip opening 258 and is optional. While the retaining clip 216 illustrated has two retaining clip arms 260, in other embodiments the retaining clip 216 may have only a single arm. Accordingly, the guide tube holder 212 may have only one retaining clip opening 248.

Figure 7A:
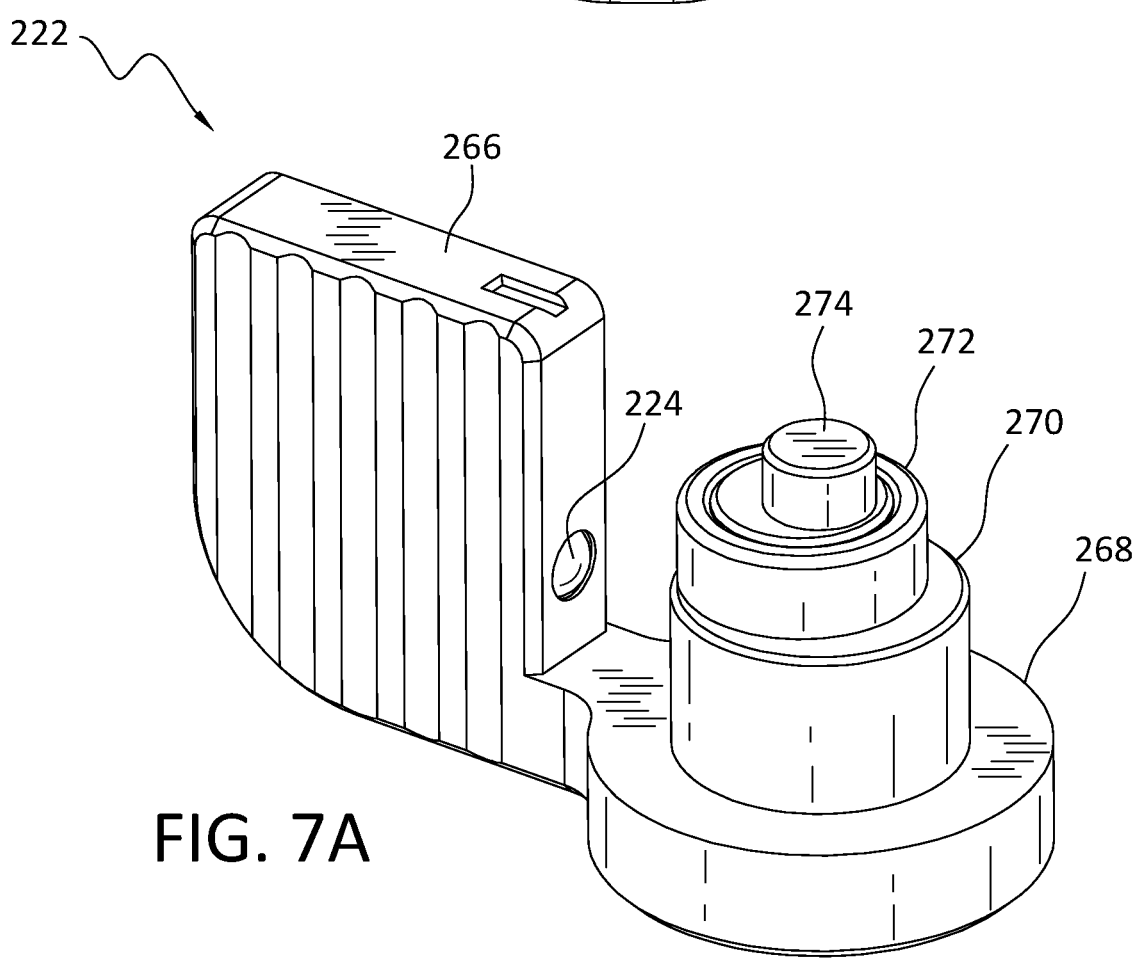
FIGS. 7A-C illustrate perspective, top, and side views of an embodiment of the locking lever.
Figure 7B:
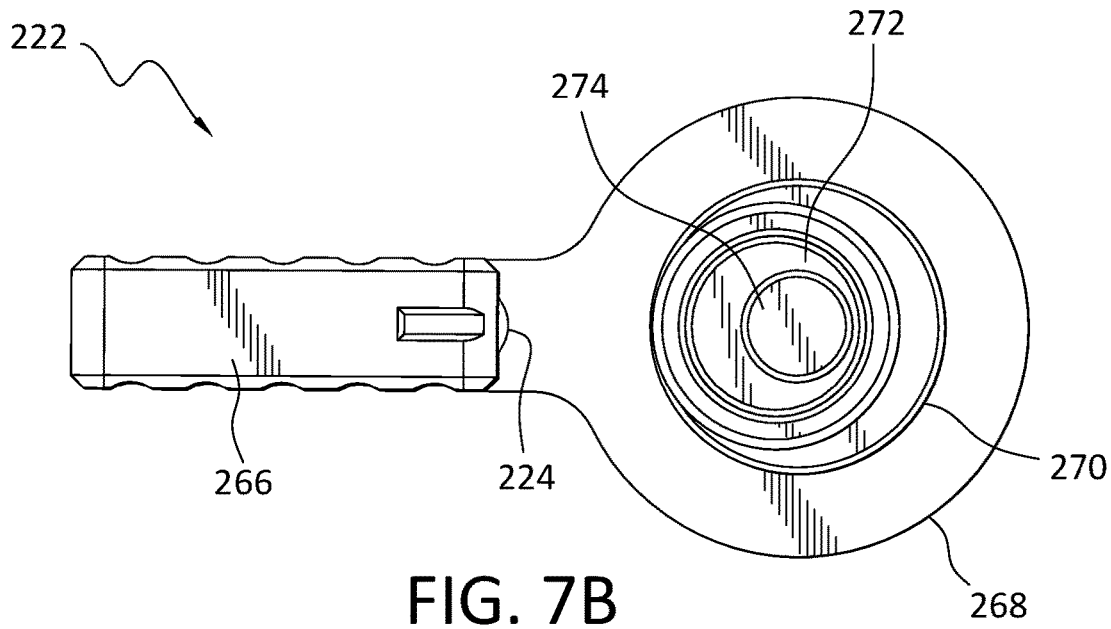
Figure 7C:
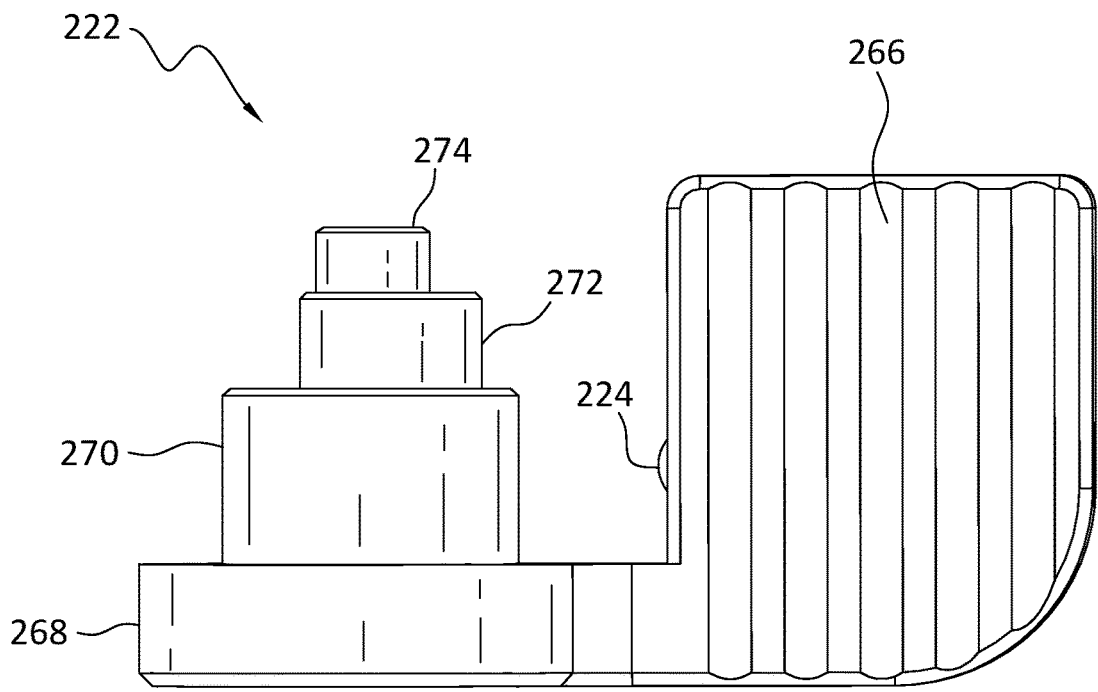
Figures 8A, 8B:
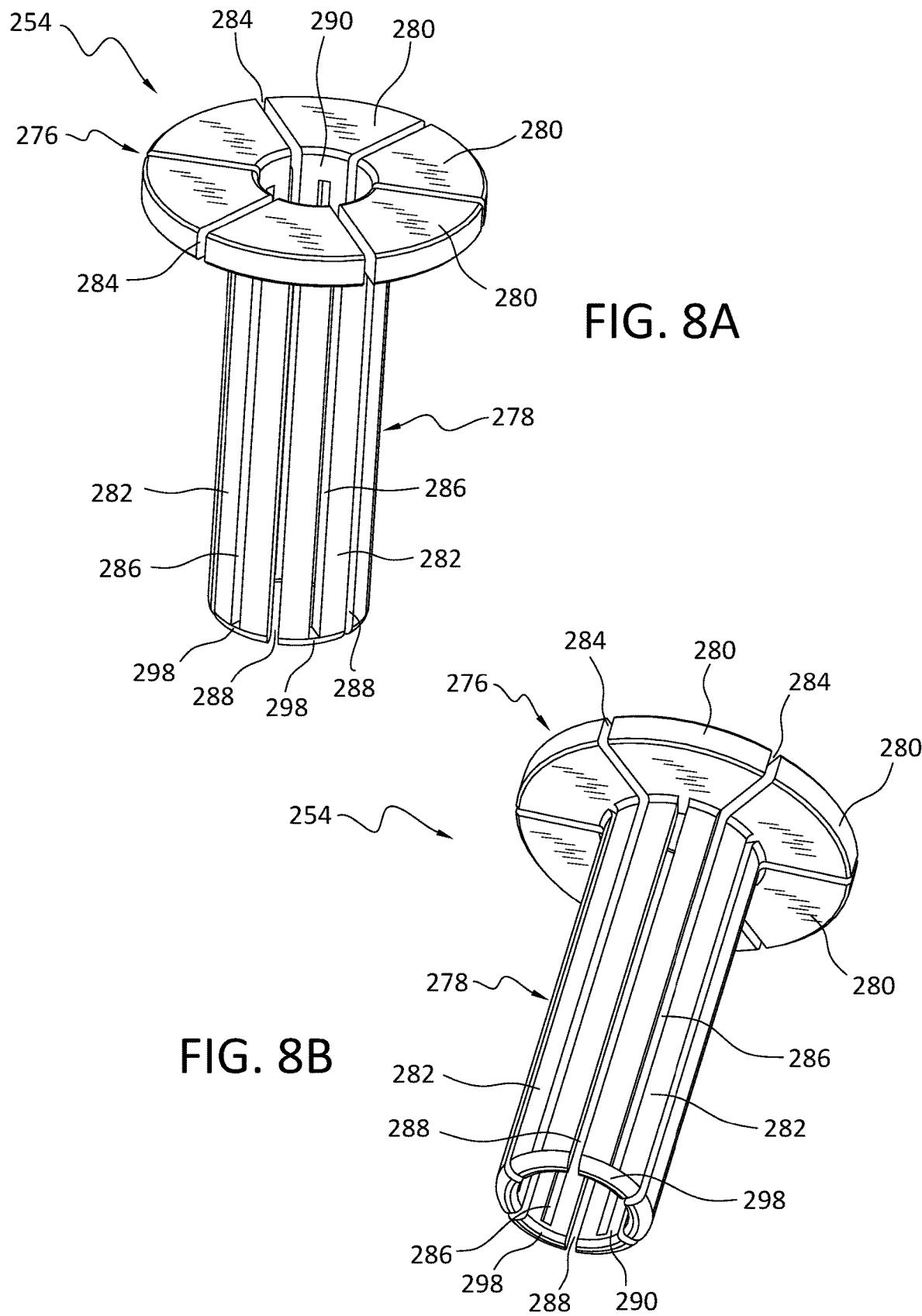
FIGS. 8A-D illustrate top perspective, bottom perspective, top, and bottom views of an embodiment of the guiding insert.
Figure 8C:
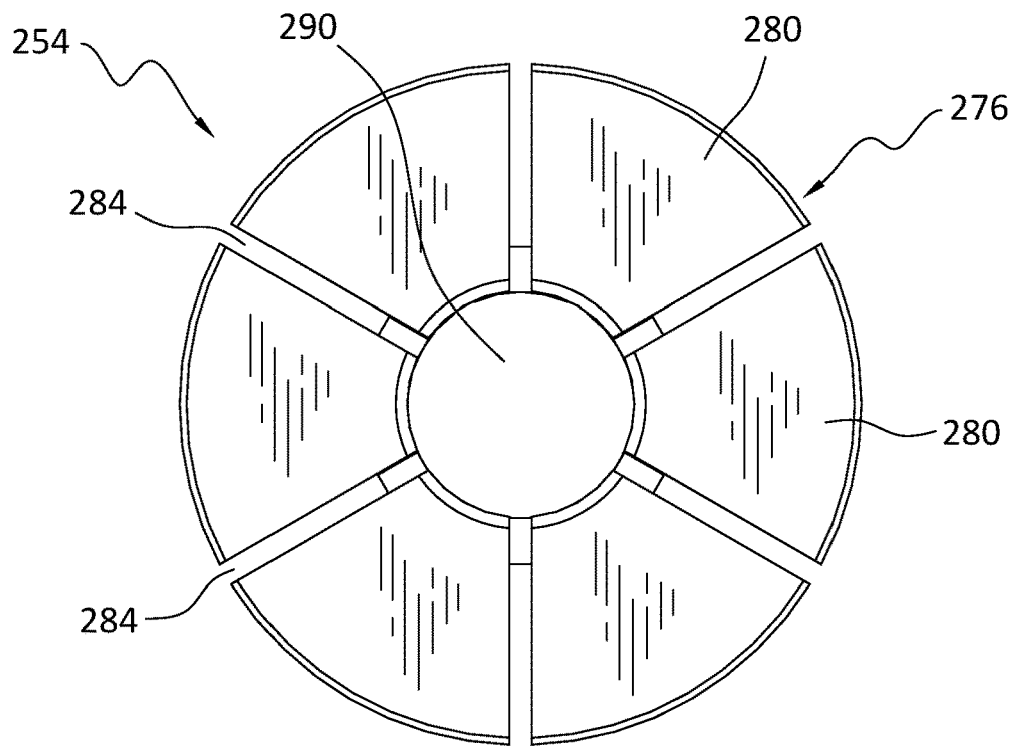
Figure 8D:
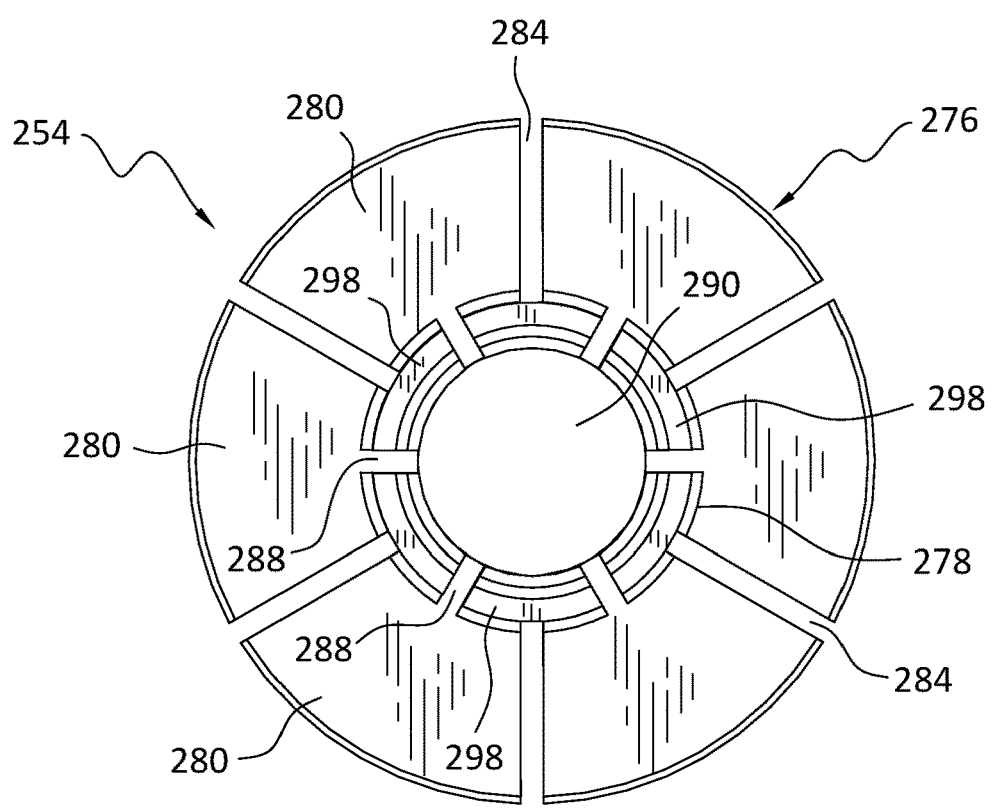

FIGS. 7A-C illustrate perspective, top, and side views of an embodiment of the locking lever 222. The locking lever 222 includes locking lever handle 266. The locking lever 222 allows a user of the robotic connector 200 to rotate the locking lever 222 to lock the guiding insert 254 and guide tube 132 to the robotic connector 200. The locking lever handle 266 includes a channel (not shown) that has a spring 226 therein, a plug 220 at one end, and a detent ball 224 at the other end. The spring 226 biases the detent ball 224 outward, and the detent ball 224 engages locking lever stop 238 to fix the locking lever handle 266 in the unlocked position.

The locking lever handle 266 also includes locking lever base 268 attached to the locking lever handle 266. A locking lever lower axle 270, locking lever cam 272, and locking lever upper axle 274 extend from locking lever base 268. The locking lever lower axle 270 has a first diameter this is substantially the same as the inner diameter of locking lever opening 234. The locking lever lower axle 270 is placed in locking lever opening 234 and allows the locking lever 222 to rotate about locking lever lower axle 270. The locking lever upper axle 274 has a second diameter that is substantially the same as the inner diameter of pivot hole 236. The locking lever upper axle 274 is placed in the pivot hole 236 and allows the locking lever 222 to rotate about the locking lever upper axle 274. The locking lever lower axle 270 and locking lever upper axle 274 provide a stable axis of rotation for the locking lever 222 relative to the retaining clip body 292. It is noted that the locking lever lower axle 270 and locking lever upper axle 274 are coaxial. Further, their diameters may be selected so that the guiding insert lock assembly 256 can be assembled.

The locking lever cam 272 has a third diameter and has an axis that is offset from the axes of locking lever lower axle 270 and locking lever upper axle 274. This offset means that when the locking lever handle 266 is rotated, the locking lever cam 272 urges the retaining clip 216 towards the guiding insert 254 and locks the guiding insert 254 to the robotic connector 200. The locking lever cam 272 is sized and arranged to provide the force needed to lock the guiding insert 254.

FIGS. 8A-D illustrate top perspective, bottom perspective, top, and bottom views of an embodiment of the guiding insert 254. The guiding insert 254 may include insert tube 278 and insert collar 276. The insert tube 278 has cylindrical shape and insert collar 276 has a disk shape. An insert opening 290 extends through guiding insert 254 that receives the guide tube 132. The guiding insert 254 is a compressible guiding insert that has a number of slits that allow the guiding insert 254 to be compressed by the retaining clip 216 and thereby engage and secure the guide tube 132 that is inserted in the guiding insert 254. As illustrated, the insert tube 278 includes insert tube segment slits 286 and insert tube slits 288. The insert collar 276 includes insert collar slits 284 that divide the insert collar 276 into insert collar segments 280. The insert tube 278 includes insert tube segments 282 separated by insert tube segment slits 286 and insert tube slits 288. The insert tube segments 282 surrounding an insert tube segment slit 286 are joined at the end of the insert tube 278 by an arm connector 298 away from the insert collar 276. Further, insert tube slits 288 are between pairs of connected insert tube segments 282. As a result, insert tube segment slits 286 align with insert collar slits 284. The insert tube slits 288 end in a middle portion of the insert collar segments 280. This arrangement of the slits and segments allows for the contact guiding insert 254 to maintain its shape and structure while allowing for the contact guiding insert 254 to be flexible so that the retaining clip 216 may compress the contact guiding insert 254 against the guide tube 132. It is noted that the number of insert collar segments 280, insert collar slits 284, insert tube segments 282, insert tube segment slits 286, and insert tube slits 288 can be any number that allows for the flexibility required for the guiding insert 254 to be able to compress and secure the guide tube 132.

The guiding insert 254 of FIGS. 8A-D will be sized to accommodate different sized associated guide tubes 132 that are needed during a surgery. The outer diameter of insert tube 278 of guiding insert 254 will be fixed to the inner diameter of guide tube holder opening 242. Then the inner diameter of insert opening 290 will be based upon the implant and/or tool used to carry out surgical steps. The robotic connector 200 and guiding insert 254 use only a single locking mechanism to lock the guide tube 132 to the robotic connector 200.

Figure 9A:
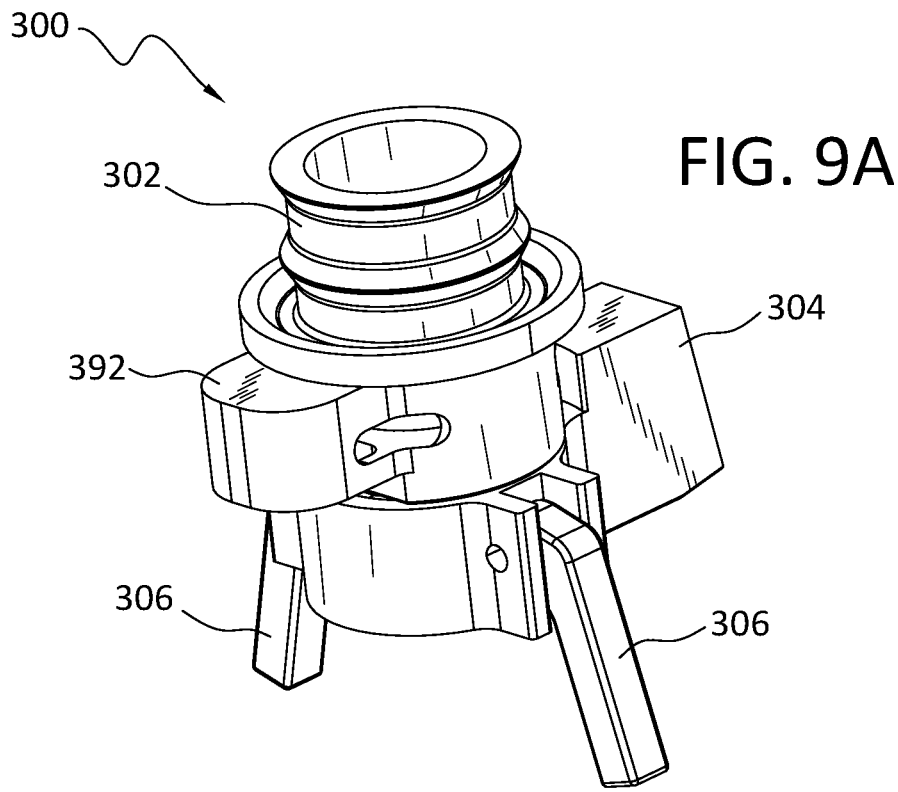
FIGS. 9A-C illustrate perspective, exploded, and cross-sectional views of another embodiment of a robotic connector.
Figure 9B:
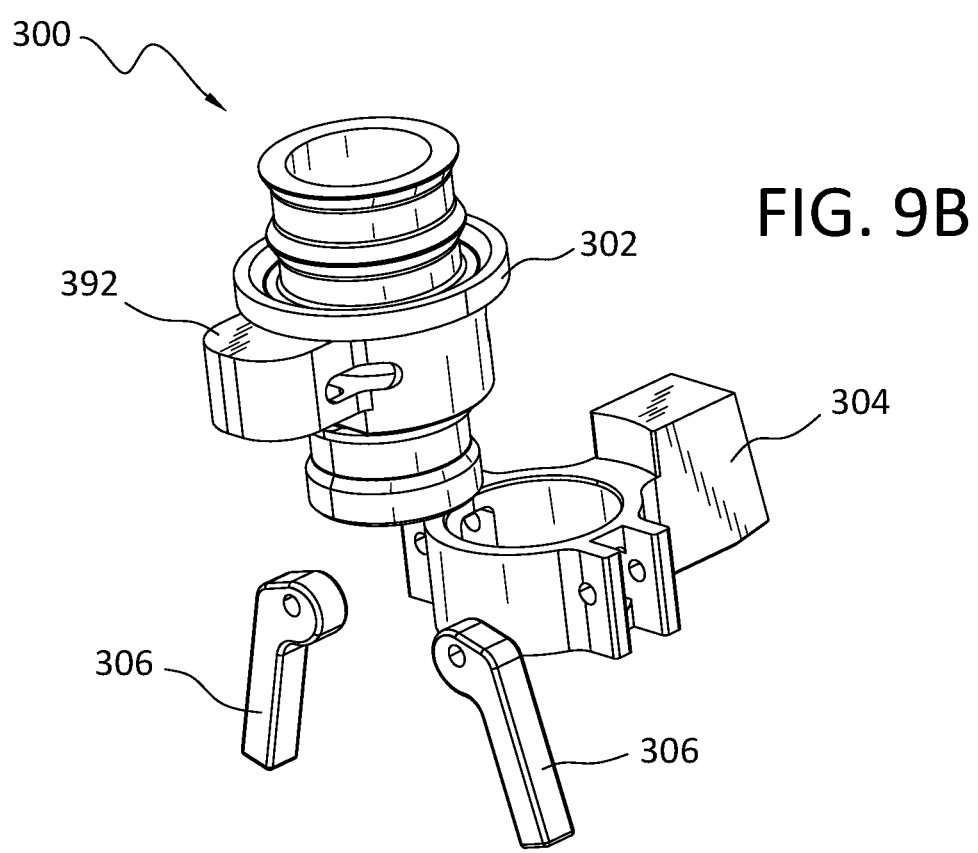
Figure 9C:
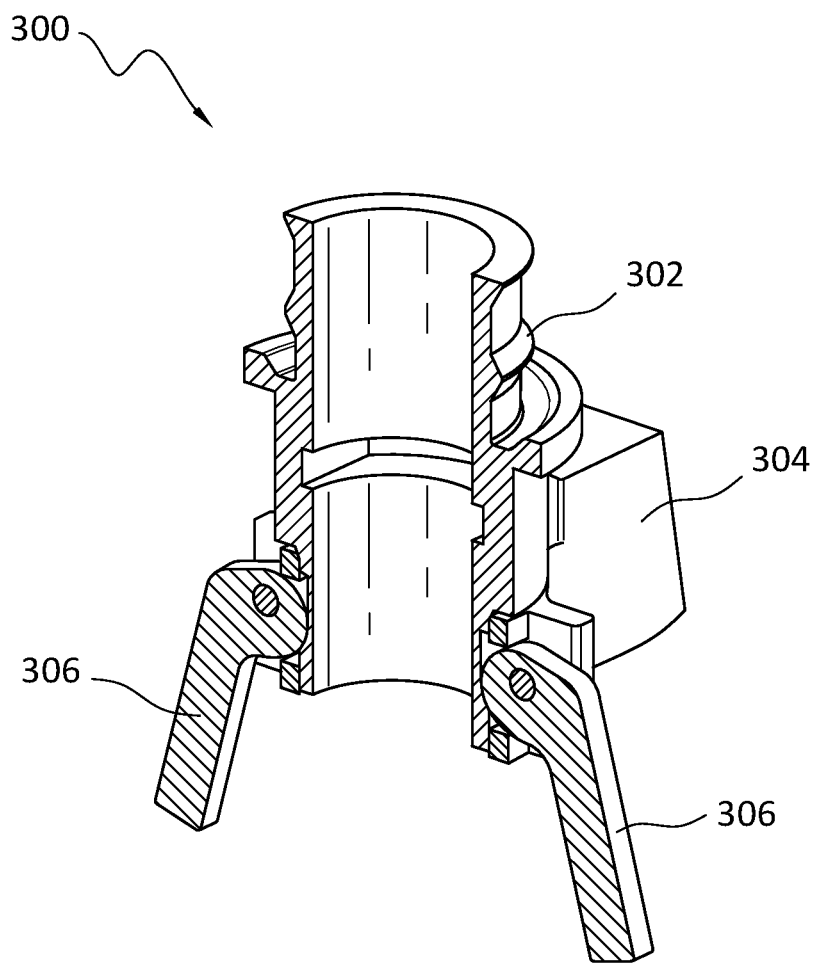
Figure 10A:
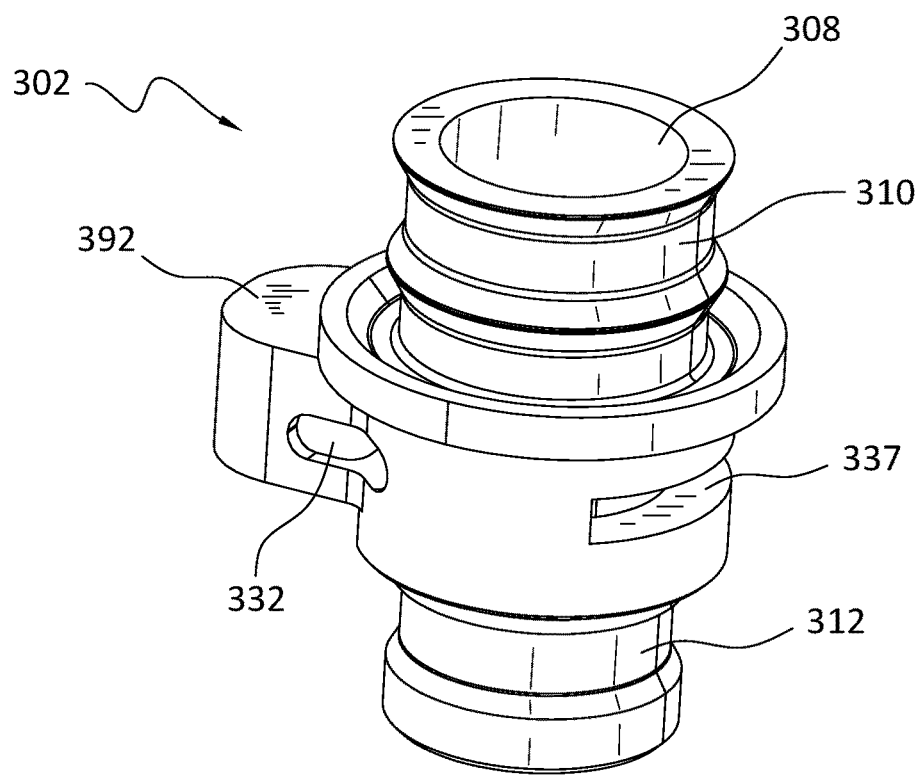
FIGS. 10A-D illustrate top perspective, bottom perspective, top, and bottom views of guiding insert.
Figure 10B:
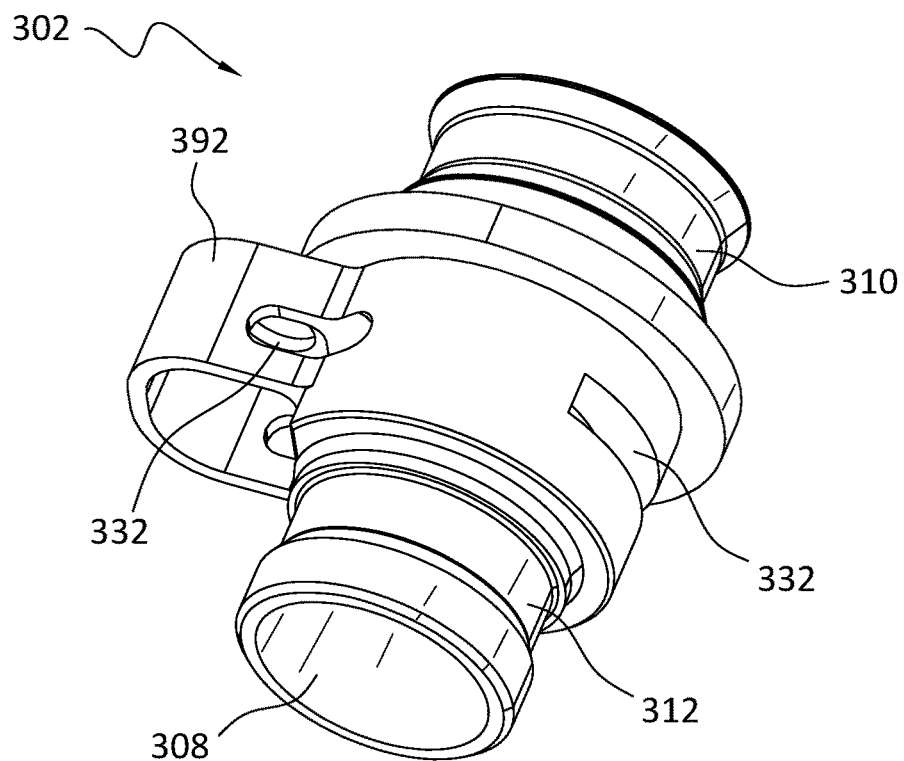
Figure 10C:
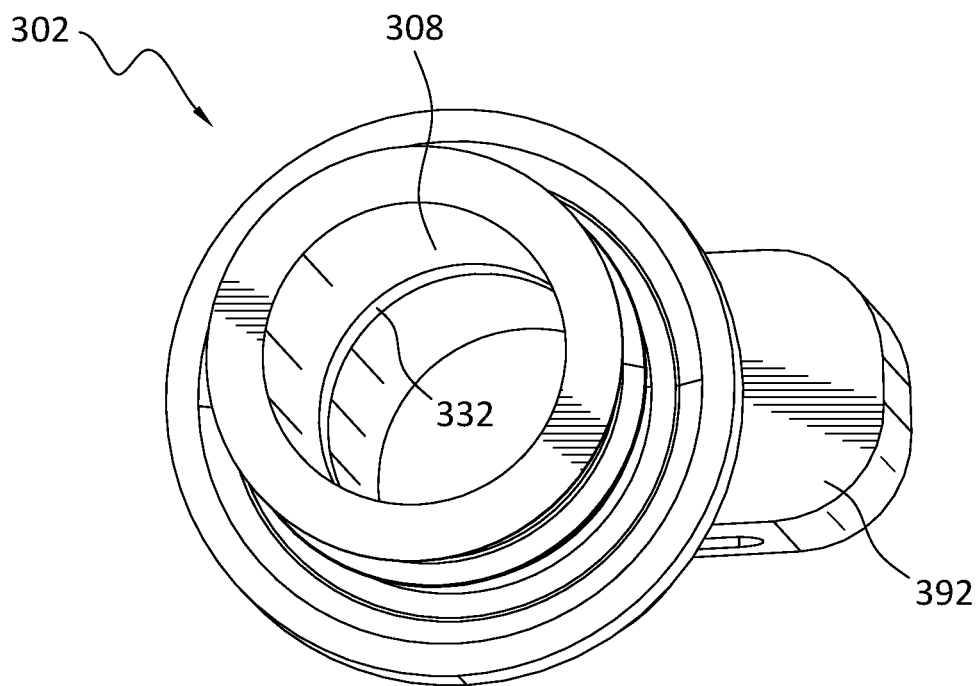
Figure 10D:
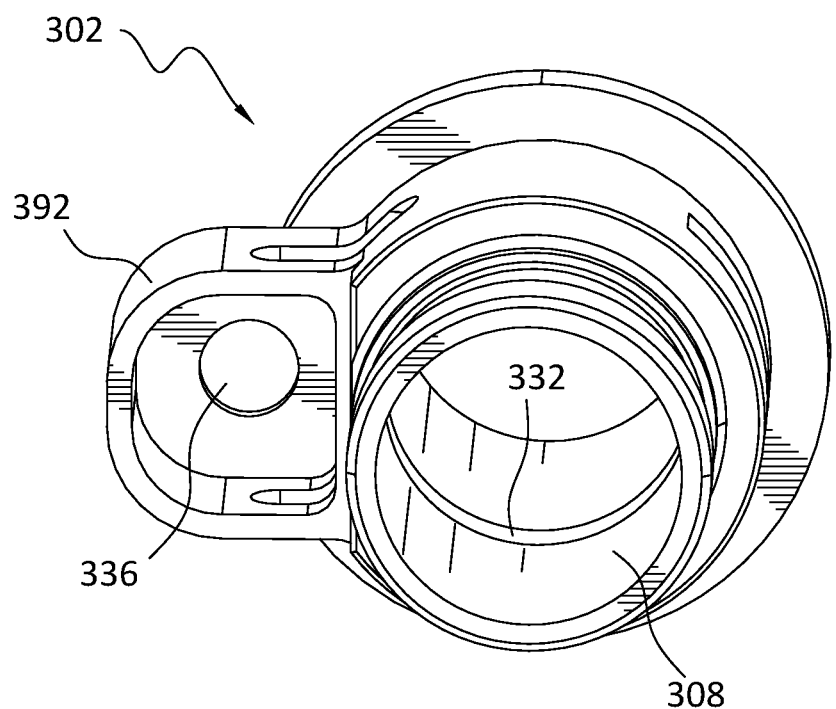

FIGS. 9A-C illustrate perspective, exploded, and cross-sectional views of another embodiment of a robotic connector 300. The robotic connector 300 includes end effector 304, guiding insert 302, and locking levers 306. The end effector 304 may connect to mounting interface 130. The guiding insert 302 receives the guide tube 132. The guiding insert 302 may inserted into and removed from the end effector 304. The locking levers 306 are used to lock the guiding insert 302 to the end effector 304.

FIGS. 10A-D illustrate top perspective, bottom perspective, top, and bottom views of guiding insert 302. The guiding insert 302 includes insert opening 308 that receives the guide tube 132. The guiding insert 302 includes insert array groove 310 that provides a location for the attachment of a tracking array. The guiding insert 302 includes insert locking groove 312. The ends of locking levers 306 engage the insert locking groove 312 when the locking levers 306 are put in the locked position to securely lock the guiding insert 302 to the end effector 304. The insert locking groove 312 is shaped complementary to the ends of the locking levers 306 so that locking levers 306 lock the guiding insert 302 in place.

The guiding insert 302 includes retaining clip body 392 having a pivot hole 336. Further, the guiding insert 302 includes retaining clip slot 332. Although not shown, the retaining clip body 392 will include a locking mechanism such as the guiding insert lock assembly 256 described above. The retaining clip 216 will be inserted into retaining clip slot 332 and operate as described above. This locking mechanism will lock the guide tube 132 to the guiding insert 302.

Figure 11A:
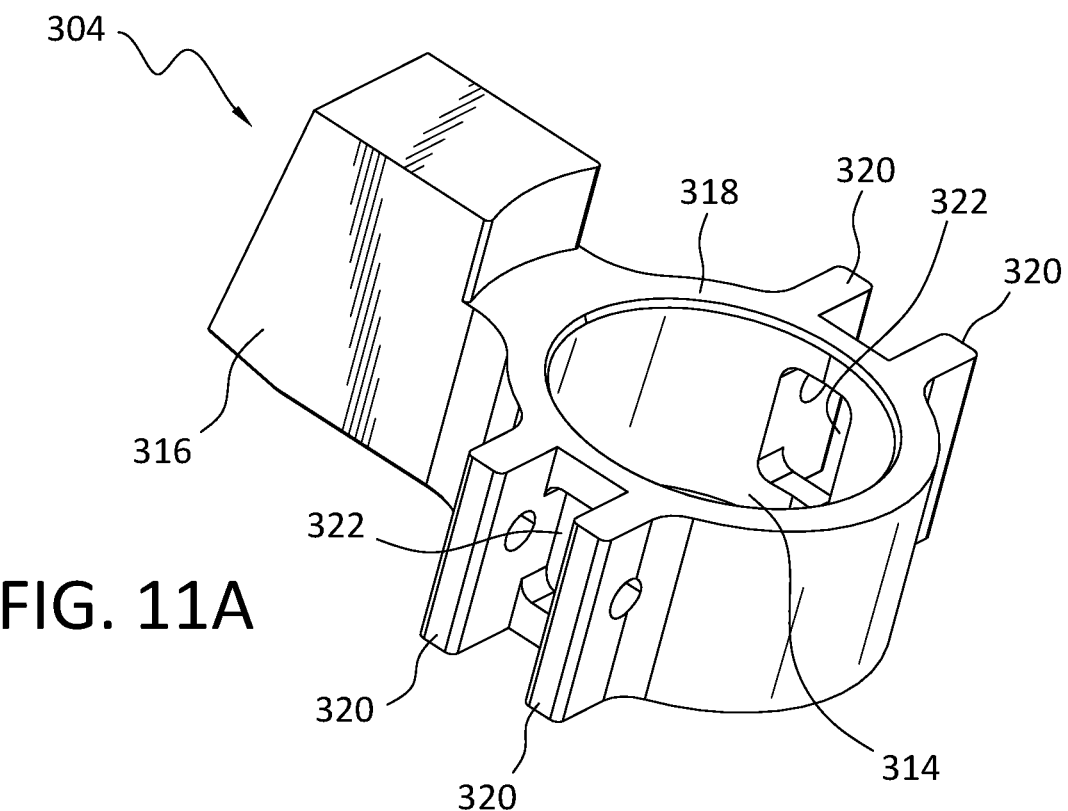
FIGS. 11A and 11B illustrate top perspective and bottom perspective views of end effector.
Figure 11B:
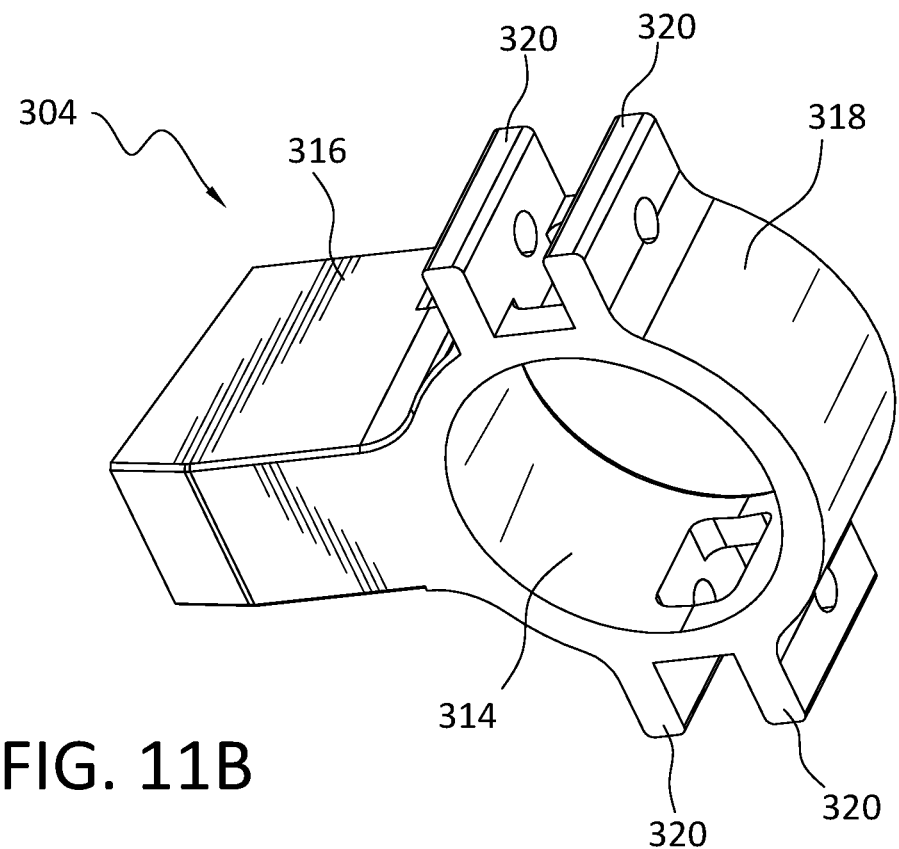

FIGS. 11A and 11B illustrate top perspective and bottom perspective views of end effector 304. The end effector 304 includes end effector body 316 and end effector ring 318. The end effector body 316 connects to mounting interface 130. The end effector ring 318 extends from end effector body 316. The end effector ring 318 includes end effector opening 314, locking lever opening 322, and end effector lever mounts 320. The end effector opening 314 receives the guiding insert 302. The locking levers 306 attach to end effector lever mounts 320. The locking lever openings 322 allow the ends of the locking levers 306 to pass through the end effector ring 318 and engage insert locking groove 312 of the guiding insert 302. While the robotic connector 300 of FIGS. 11A and 11B illustrates two levers, one lever or more than two levers may be used instead.

In operation, the guiding insert 302 is placed in the end effector 304, and the guiding insert 302 is locked to the end effector 304 by rotating the locking levers 306. Then guide tube 132 is placed in the guiding insert 302 and the handle of the locking mechanism (not shown) is rotated to lock the guide tube 132 in the guiding insert 302. This process may be reversed in order to remove the cylindrical guide tube 132 and guiding insert 302 so that a different sized cylindrical guide tube 132 and guiding insert 302 may be placed in the robotic connector 300.

Figure 12A:
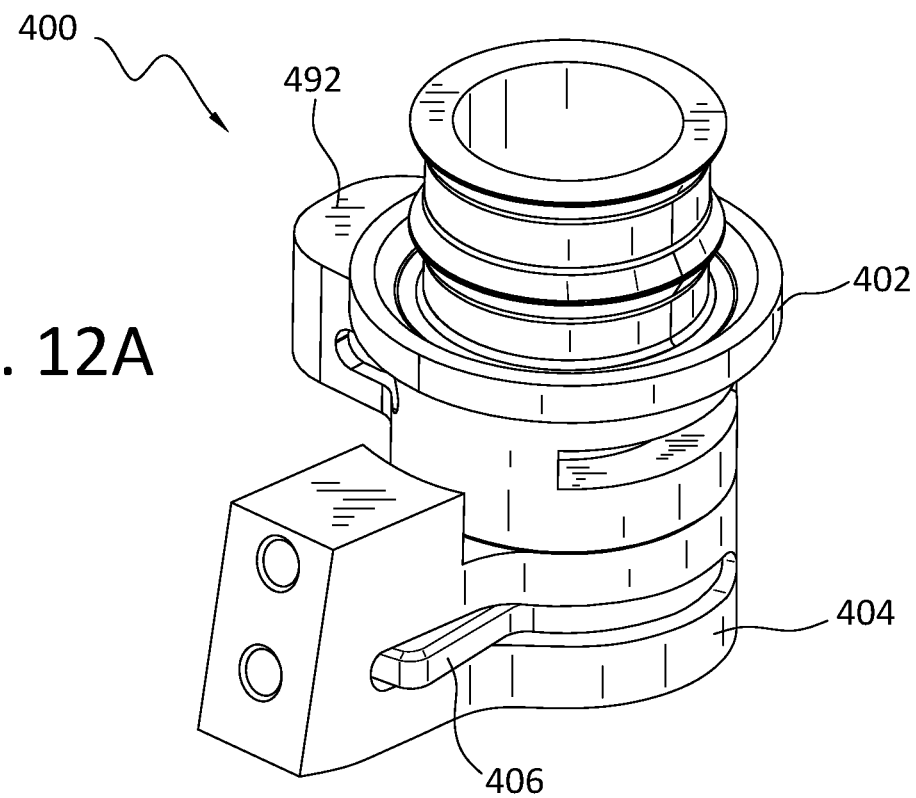
FIGS. 12A-12C illustrate perspective, side cross-sectional, and top cross-sectional views of another embodiment of a robotic connector.
Figure 12B:
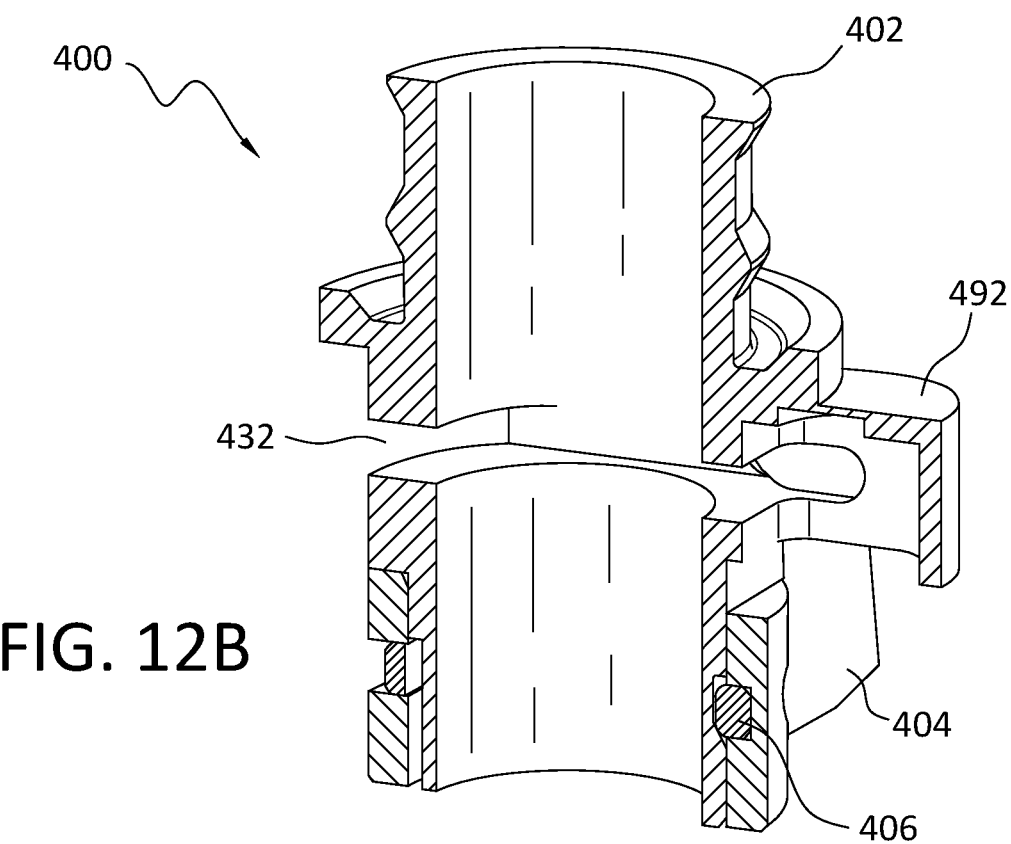
Figure 12C:
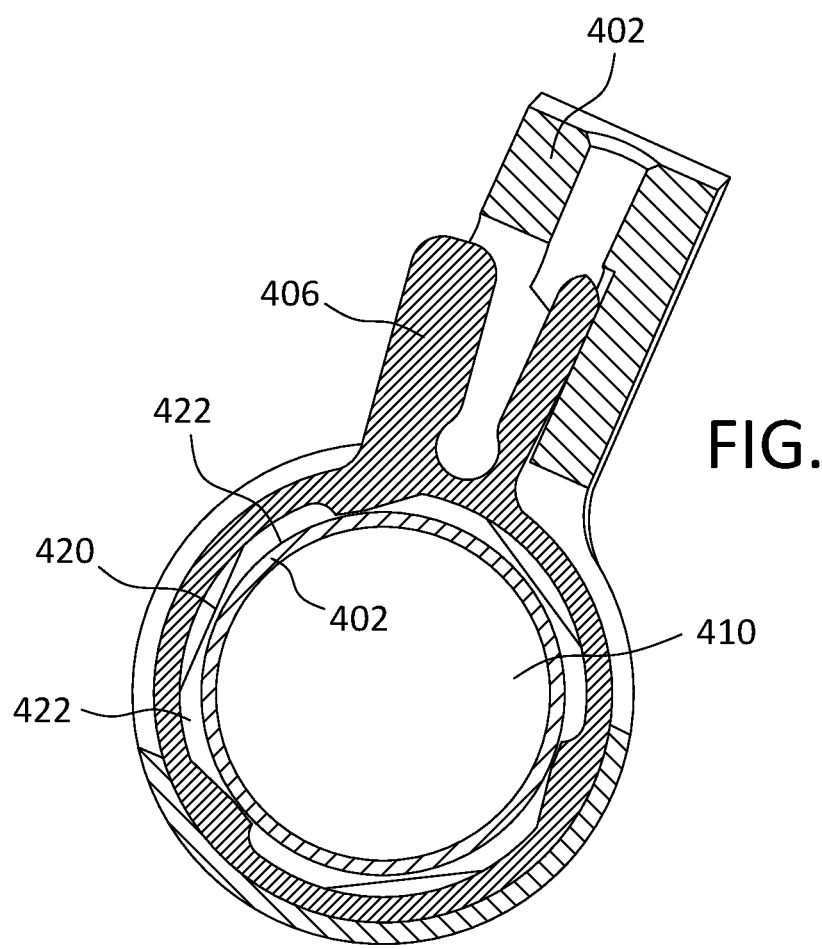

FIGS. 12A-12C illustrate perspective, side cross-sectional, and top cross-sectional views of another embodiment of a robotic connector 400. The robotic connector 400 includes end effector 404, guiding insert 402, and locking ring 406. The end effector 404 may connect to mounting interface 130. The guiding insert 402 receives the guide tube 132. The guiding insert 402 may be inserted into and removed from the end effector 404. The locking ring 406 is used to lock the guiding insert 402 to the end effector 404.

Figure 13:
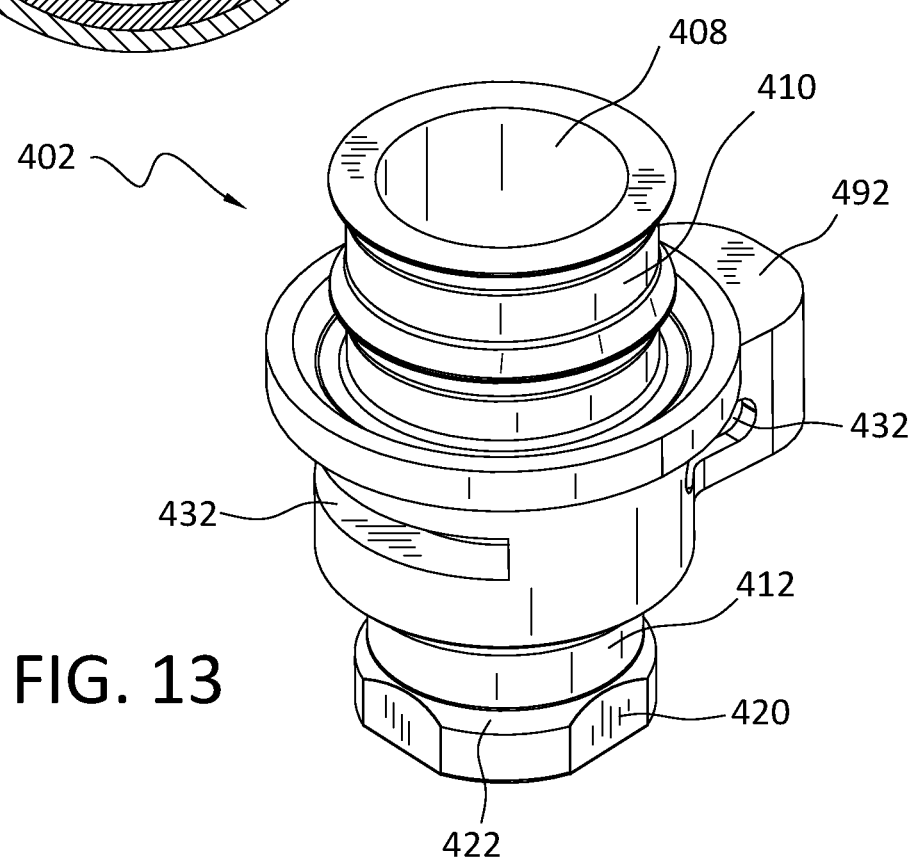
FIG. 13 illustrates a top perspective view of the guiding insert.

FIG. 13 illustrates a top perspective view of the guiding insert 402. The guiding insert 402 includes inert opening 408 that receives the guide tube 132. The guiding insert 402 includes insert array groove 410 that provides a location for the attachment of a tracking array. The guiding insert 402 includes insert locking groove 412. Locking edges 422 are adjacent the locking groove 412, and release surfaces 420 are in between the locking edges 422. Locking protrusions 418 on the locking ring 406 engage the locking edges 422 to securely lock the guiding insert 402 to the end effector 404. The release surfaces 420 allow the guiding insert 402 to be removed from end effector 404 when the locking ring 406 is rotated. The robotic connector 400 has a locking ring 406 with three locking protrusions 418 and a guiding insert 402 with three release surfaces 420, but other numbers of locking protrusions 418 and release surfaces 420 may be used as well.

The guiding insert 402 includes retaining clip body 492. Further, the guiding insert 402 includes retaining clip slot 432. Although not shown, the retaining clip body 492 will include a locking mechanism such as the guiding insert lock assembly 256 described above. The retaining clip 216 will be inserted into retaining clip slot 432 and operate as described above. This locking mechanism will lock the guide tube 132 to the guiding insert 402.

Figure 14:
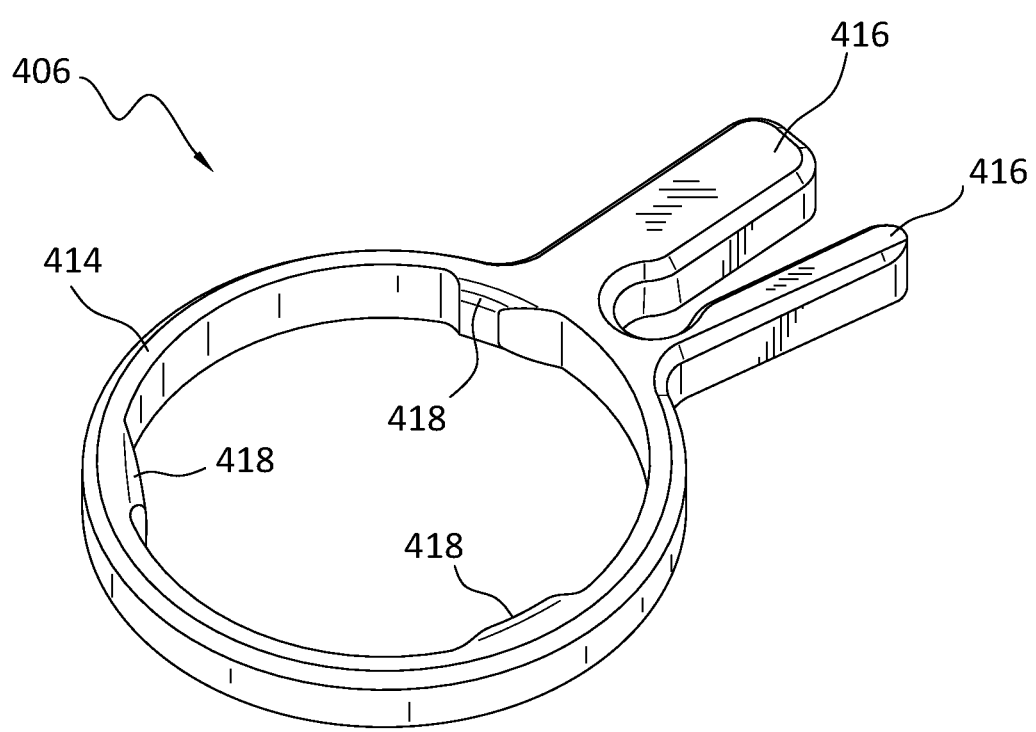
FIG. 14 illustrates a perspective view of locking ring.

FIG. 14 illustrates a perspective view of locking ring 406. The locking ring 406 may include locking ring handles 416, ring 414, and locking protrusions 418. The locking ring handles 416 extend from ring 414 and allow for the locking ring 406 to be rotated in end effector. In some embodiments, the locking ring 406 may have one locking ring handle 416. The ring 414 includes locking protrusions 418 that protrude inward from the ring. The locking protrusions 418 will engage locking edges 422 of the locking groove 412 to securely lock the guiding insert 402 to end effector 404.

In operation, the guiding insert 402 is placed in the end effector 404 when the locking ring 406 is in an unlocked position so that the release surfaces 420 are aligned with the locking protrusions 418. Next, the guiding insert 402 is locked to the end effector 404 by rotating the locking ring 406. Then the guide tube 132 is placed in the guiding insert 402 and the handle of the locking mechanism (not shown) is rotated to lock the guide tube 132 in the guiding insert 402. This process may be reversed in order to remove the cylindrical guide tube 132 and guiding insert 402 so that a different sized cylindrical guide tube 132 and guiding insert 402 may be placed in the robotic connector 400.

The robot connecters described herein allow for the swapping of guide tubes and tools without the need to remove the connector from the mounting interface. This reduces the chance of damage to the drape. It also means that just the guide tube holder and guide tube do not need to be changed in order to use different sized tools. This further reduces the amount recalibration of the system as different tools are used. Also, the locking mechanism of the robot connector increases the stability of the computer-assisted surgical system that leads to increased accuracy of the system. The embodiment of FIGS. 2A-8D also provides the benefit of using only one locking mechanism.

While each of the embodiments are described above in terms of their structural arrangements, it should be appreciated that the invention also covers the associated methods of using the embodiments described above.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications and combinations of the various embodiments can be affected while remaining within the spirit and scope of the invention. Accordingly, the foregoing disclosure, description, and figures are for illustrative purposes only and do not in any way limit the invention, which is defined only by the claims.

What is claimed is:

1. A robot connector, comprising:
a connector configured to connect to a mounting surface of a robot;
a guiding insert that is compressible in a radial direction around a longitudinal direction, wherein the guiding insert has an opening extending in the longitudinal direction configured to receive a guide tube;
a guide tube holder with an opening wherein the guide tube is attached to the connector and the opening is configured to receive the compressible guiding insert; and
a locking mechanism configured to lock the guiding insert and the guide tube to the connector.

2. The robot connector of claim 1, wherein the guiding insert includes a collar and a tube.

3. The robot connector of claim 2, wherein the tube includes a plurality of tube slits extending in the longitudinal direction.

4. The robot connector of claim 3, wherein the collar includes a plurality of collar slits extending in the radial direction.

5. The robot connector of claim 4, wherein the tube includes a plurality of tube segments separated by the plurality tube slits.

6. The robot connector of claim 5, wherein adjacent pairs of tube segments are connected to different collar segments at a proximal end and to one another by an arm connector at a distal end.

7. The robot connector of claim 6, wherein the slits separating the adjacent pairs of tube segments align with the collar slits.

8. The robot connector of claim 1, wherein the locking mechanism includes a locking lever and a retaining clip, wherein the locking lever moves an end of the retaining clip into contact with the guiding insert when the locking lever is rotated.

9. The robot connector of claim 8, wherein the guide tube holder includes an opening configured to receive the end of the retaining clip.

10. A method of using the robot connector of claim 1, comprising:
attaching the connector to the robot over a drape;
selecting a first guiding tube associated with a first surgical step based upon the size of a first surgical tool used in the first surgical step;
inserting a first guiding insert associated with the first selected guiding tube in the guide tube holder;
inserting the selected first guiding tube in the first guiding insert; and
locking the first guiding insert and first guiding tube to the connector using the locking mechanism.

11. The method of claim 10, further comprising:
unlocking the first guiding insert and first guiding tube from the connector using the locking mechanism;
removing the selected first guiding tube and the first guiding insert from the connector;
selecting a second guiding tube associated with a second surgical step based upon the size of a second surgical tool used in the second surgical step;
inserting a second guiding insert associated with the second selected guiding tube in the guide tube holder;
inserting the selected second guiding tube in the second guiding insert; and
locking the second guiding insert and second guiding tube to the connector using the locking mechanism.

12. A robot connector, comprising:
a guiding insert with a first locking mechanism and an opening, wherein the opening is configured to receive a guide tube and the first locking mechanism is configured to lock the guide tube to the guiding insert; and
an end effector configured to be connected to the robot, wherein the end effector includes:
an opening configured to receive the guiding insert; and
a second locking mechanism configured to lock the guiding insert to the end effector.

13. The robot connector of claim 12, wherein the second locking mechanism includes a locking lever configured to engage and lock the guiding insert through a locking lever opening in the end effector.

14. The robot connector of claim 13, wherein the guiding insert includes a locking groove configured to engage the locking lever.

15. The robot connector of claim 12, wherein the second locking mechanism includes a locking ring configured to engage and lock the guiding insert when the locking ring is rotated.

16. The robot connector of claim 15, wherein the locking ring includes a locking protrusion configured to engage a locking edge of a locking groove in the guiding insert.

17. The robot connector of claim 16, wherein guiding insert includes a release surface configured to align with the locking protrusion so that the guiding insert may be separated from end effector.

18. A method of using the robot connector of claim 12, comprising:
attaching the end effector to the robot over a drape;

selecting a first guiding tube associated with a first surgical step based upon the size of a first surgical tool used in the first surgical step;

inserting a first guiding insert associated with the first selected guiding tube in the end effector;

locking the first guiding insert to the end effector using the second locking mechanism;

inserting the selected first guiding tube in the first guiding insert; and locking the first guiding tube to the first guiding insert using the first locking mechanism.

19. The method of claim 18, further comprising;

unlocking the first guiding insert from the end effector using the second locking mechanism;

removing the first guiding insert from the end effector;

selecting a second guiding tube associated with a second surgical step based upon the size of a second surgical tool used in the second surgical step;

inserting a second guiding insert associated with the second selected guiding tube in the end effector;

locking the second guiding insert to the end effector using the second locking mechanism;

inserting the selected second guiding tube in the second guiding insert; and locking the second guiding tube to the second guiding insert using the first locking mechanism.

20. The method of claim 18, further comprising;

unlocking first guiding tube from the first guiding insert using the first locking mechanism; and removing the first guiding tube from the first guiding insert.

* * * * *